United States Patent
Xiong et al.

(10) Patent No.: US 10,715,037 B2
(45) Date of Patent: Jul. 14, 2020

(54) HIGH-EFFICIENCY SWITCHED-CAPACITOR POWER SUPPLIES AND METHODS

(71) Applicant: THE UNIVERSITY OF HONG KONG, Hong Kong (CN)

(72) Inventors: Song Xiong, Hong Kong (CN); Siew Chong Tan, Hong Kong (CN); Shu Yuen (Ron) Hui, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 0 days.

(21) Appl. No.: 16/322,029

(22) PCT Filed: Aug. 5, 2016

(86) PCT No.: PCT/CN2016/093520
§ 371 (c)(1),
(2) Date: Jan. 30, 2019

(87) PCT Pub. No.: WO2018/023695
PCT Pub. Date: Feb. 8, 2018

(65) Prior Publication Data
US 2019/0190376 A1    Jun. 20, 2019

(51) Int. Cl.
*H02M 3/07* (2006.01)
*H02M 7/12* (2006.01)
(Continued)

(52) U.S. Cl.
CPC ............... *H02M 3/07* (2013.01); *H02M 7/12* (2013.01); *H02M 7/48* (2013.01); *H02M 5/42* (2013.01);
(Continued)

(58) Field of Classification Search
CPC . H02M 3/07; H02M 3/073; H02M 2001/0077
See application file for complete search history.

(56) References Cited

U.S. PATENT DOCUMENTS 5,414,614 A * 5/1995 Fette ................. H02M 3/07
363/59
5,581,454 A    12/1996 Collins
(Continued)

FOREIGN PATENT DOCUMENTS

CN    106301042    *    1/2017
CN    109194170    *    1/2018
(Continued)

OTHER PUBLICATIONS

Machine English Translation of CN108616224, Zhang Qi,Boost single-phase seven-level inverter, Oct. 2018.*
(Continued)

*Primary Examiner* — Adolf D Berhane
*Assistant Examiner* — Sisay G Tiku
(74) *Attorney, Agent, or Firm* — Saliwanchik, Lloyd & Eisenschenk

(57) ABSTRACT

Switched capacitor (SC) converters with excellent voltage regulation, high conversion efficiency, and good suitability for a wide range of applications are provided. An SC converter can include at least two SC sub-circuits, and at least one of these SC sub-circuits can be of variable gain. One SC sub-circuit can convert the input voltage of the SC converter to an output voltage close to the desired output voltage value for the SC converter, and another SC sub-circuit having variable gain can convert the input voltage to an output voltage with a high resolution of small discrete voltage steps.

27 Claims, 18 Drawing Sheets

(51) Int. Cl.
*H02M 7/48* (2007.01)
*H02M 5/42* (2006.01)
*H02M 7/04* (2006.01)
*H02M 7/44* (2006.01)

(52) U.S. Cl.
CPC .............. *H02M 7/04* (2013.01); *H02M 7/44* (2013.01); *H02M 2003/072* (2013.01)

(56) References Cited

U.S. PATENT DOCUMENTS

| | | | |
|---|---|---|---|
| 5,831,469 A | 11/1998 | Menichelli | |
| 5,973,944 A | 10/1999 | Nork | |
| 6,055,168 A | 4/2000 | Kotowski et al. | |
| 6,169,673 B1* | 1/2001 | McIntyre | H02M 3/07 363/59 |
| 6,198,645 B1* | 3/2001 | Kotowski | H02M 3/07 307/110 |
| 6,300,820 B1 | 10/2001 | Fotouhi et al. | |
| 6,310,789 B1 | 10/2001 | Nebrigic et al. | |
| 6,438,005 B1 | 8/2002 | Walter | |
| 6,483,282 B1 | 11/2002 | Bayer | |
| 6,756,838 B1 | 6/2004 | Wu et al. | |
| 6,920,055 B1 | 7/2005 | Zeng et al. | |
| 6,927,441 B2 | 8/2005 | Pappalardo et al. | |
| 7,170,271 B2 | 1/2007 | Coffey et al. | |
| 7,190,210 B2* | 3/2007 | Azrai | H02M 3/07 257/298 |
| 7,276,960 B2 | 10/2007 | Peschke | |
| 7,307,858 B2 | 12/2007 | Kuratli | |
| 7,375,992 B2 | 5/2008 | Mok et al. | |
| 7,468,898 B2 | 12/2008 | Ogata et al. | |
| 7,586,362 B2 | 9/2009 | Pan et al. | |
| 7,663,427 B2 | 2/2010 | Fujiwara | |
| 8,089,788 B2 | 1/2012 | Jain | |
| 8,295,064 B2 | 10/2012 | Shiwaya | |
| 8,368,369 B2 | 2/2013 | Seeman et al. | |
| 10,103,621 B2* | 10/2018 | Junmin | H02M 3/07 |
| 2001/0033501 A1 | 10/2001 | Nebrigic | |
| 2002/0089313 A1* | 7/2002 | Shashoua | H02M 3/07 323/209 |
| 2005/0213267 A1 | 9/2005 | Azrai et al. | |
| 2005/0213280 A1 | 9/2005 | Azrai et al. | |
| 2006/0006855 A1 | 1/2006 | Feng et al. | |
| 2006/0019721 A1 | 1/2006 | Kuratli | |
| 2006/0028849 A1 | 2/2006 | Ogata et al. | |
| 2010/0188065 A1 | 7/2010 | Shiwaya | |
| 2011/0101938 A1 | 5/2011 | Ma et al. | |
| 2012/0069604 A1 | 3/2012 | Yagyu et al. | |
| 2013/0058141 A1 | 3/2013 | Oraw et al. | |
| 2014/0043010 A1* | 2/2014 | Salem | H02M 3/1584 323/311 |
| 2014/0159681 A1 | 6/2014 | Oraw et al. | |
| 2015/0263612 A1 | 9/2015 | Wu et al. | |
| 2016/0079965 A1* | 3/2016 | Afridi | H02M 7/00 327/108 |
| 2016/0094126 A1* | 3/2016 | Liu | H02M 3/07 455/73 |
| 2017/0063222 A1* | 3/2017 | Teh | H02M 3/07 |
| 2018/0019668 A1* | 1/2018 | Wei | G05F 1/10 |
| 2018/0026528 A1* | 1/2018 | Xiong | H02M 3/07 323/312 |
| 2018/0375443 A1* | 12/2018 | Arulandu | H02N 1/04 |

FOREIGN PATENT DOCUMENTS

| | | | |
|---|---|---|---|
| CN | 108616224 | * | 10/2018 |
| EP | 2 385 615 A1 | | 11/2011 |

OTHER PUBLICATIONS

CN106301042, Ye Manyuan, Seven-level inverter, Jan. 2017.*
CN109194170 Ye Manyuan, A seven-level inverter using a switched capacitor circuit, Jan. 2019.*
International Search Report dated May 3, 2017 in International Application No. PCT/CN2016/093520.
Bayer, E. et al., "A High Efficiency Single-Cell Cascaded Charge Pump Topology—The Competitive Alternative to Inductive Boost Converters," 2001, pp. 290-295, IEEE.
Bayer, E. et al., "Charge Pump with ACTIVE CYCLE Regulation—Closing the Gap between Linear- and Skip Modes," 2000, pp. 1497-1502, IEEE.
Ben-Yaakov, S. et al., "Algebraic Foundation of Self Adjusting Switched Capacitors Converters," 2009, pp. 1582-1589, IEEE.
Cheung, C.K. et al., "On Energy Efficiency of Switched-Capacitor Converters," *IEEE Transactions on Power Electronics*, Feb. 2013, 28(2):862-876, IEEE.
Chung, H. S. H., "Development of DC/DC Regulators Based on Switched-Capacitor Circuits," 1999, pp. V-210-V-213, IEEE.
Chung, H. S. H. et al., "Development of Low-Profile DC/DC Converter Using Switched-Capacitor Circuits and Coreless PCB Gate Drive," 1999, pp. 48-53, IEEE.
Chung, H. S. H. et al., "On the Use of Current Control Scheme for Switched-Capacitor DC/DC Converters," *IEEE Transactions on Industrial Electronics*, Apr. 2000, 47(2):238-244, IEEE.
Ioinovici, A., "Switched-Capacitor Power Electronics Circuits," *Technical Committees*, pp. 37-42.
Mak, O.C. et al., "Inductorless Switched-Capacitor Inverter with High Power Density," 1995, pp. 1272-1278, IEEE.
Mak, O.C. et al., "Step-up DC Power Supply Based on a Switched-Capacitor Circuit," *IEEE Transactions on Industrial Electronics*, Feb. 1995, 42(1):90-97, IEEE.
Maksimović, D. et al., "Switched-Capacitor DC-DC Converters for Low-Power On-Chip Applications," 1999, pp. 54-59, IEEE.
Marusarz, R., "A Switched Capacitor, Inductorless DC to AC Voltage Step-up Power Converter," 1989, pp. 99-103, IEEE.
Ramadass, Y. K. et al., "Voltage Scalable Switched Capacitor DC-DC Converter for Ultra-Low-Power On-Chip Applications," 2007, pp. 2353-2359, IEEE.
"Renewable Energy Scenario to 2040 Half of the Global Energy Supply from Renewables in 2040," European Renewable Energy Council (EREC), pp. 1-16.
Tezuka, Y. et al., "A Low Power DC-DC Converter Using a Switched-Capacitor Transformer," 1983, pp. 261-268, IEEE.
Ueno, F. et al., "Realization of a Switched-Capacitor AC-DC Converter Using a New Phase Controller," 1991, pp. 1057-1060, IEEE.
Wu, B. et al., "A Unified Switched Capacitor Converter," 2014, pp. 2781-2786, IEEE.
Xiong, S. etal., "A Family of Exponential Step-Down Switched-Capacitor Converters and Their Applications in Two-Stage Converters," *IEEE Transactions on Power Electronics*, Apr. 2014, 29(4):1870-1880, IEEE.
Xiong, S. et al., "Analysis and Design of a High-Voltage-Gain Hybrid Switched-Capacitor Buck Converter," *IEEE Transactions on Circuits and Systems—I: Regular Papers*, May 2012, 59(5):1132-1141, IEEE.
Zhu, G. et al., "A New Switched-Capacitor DC-DC Converter with Improved Line and Load Regulations," 1999, pp. V-234-V-237, IEEE.
Zhu, G. et al., "Switched-Capacitor Power Supplies: DC Voltage Ratio, Efficiency, Ripple, Regulation," 1996, pp. 553-556, IEEE.

* cited by examiner

HIGH-EFFICIENCY SWITCHED-CAPACITOR POWER SUPPLIES AND METHODS

CROSS-REFERENCE TO RELATED APPLICATION

This application is the U.S. national stage application of International Patent Application No. PCT/CN2016/093520, filed Aug. 5, 2016, the disclosure of which is incorporated herein by reference in its entirety.

BACKGROUND OF THE INVENTION

High performance power converters having high efficiency and/or high power density are required in many renewable energy applications, the use of which has significantly increased recently and is expected to continue to increase [1]. Two types of power converters are used in such energy applications, namely inductor/transformer-based converters and switched-capacitor (SC) converters.

Inductor/transformer-based converters contain magnetic components, which are bulky and heavy, so in order to increase the power density and reduce the weight of the converter, the switching frequency can be increased to reduce the size of the magnetic components. However, the power loss of the converter will increase with increasing switching frequency if the converter is designed to work in hard switching operations. Such a power loss should be avoided because it not only decreases the converter's efficiency, but also deteriorates the working environment of the converter due to the additional heat generated. This is especially critical if the power density of the converter is high and there is less area to dissipate the heat. Additional cooling systems may be required for such converters. Alternatively, it is possible to reduce the power loss by employing soft-switching techniques, such as zero-voltage-switching (ZVS), zero-current-switching (ZCS), or both ZVS and ZCS. However, application of these techniques to converters increases the number of required components as well as the complexity of the control. Moreover, application of ZVS and/or ZCS techniques also limits the input voltage and load range of the converter, which is typically undesired for renewable energy applications.

SC converters do not have a magnetic component, and high power density is an inherent feature. Further, with only switches and capacitors in the circuit, an SC converter can easily be fabricated in integrated circuit (IC) form, which can further increase the power density of the SC converter. Therefore, an SC converter can be a good candidate for high power density applications. Currently, the general application of SC converters is mainly for performing voltage ratio transformation or voltage inversion [2]-[5]. They are typically not used for applications requiring voltage regulation. This is because with the existing types of SC converters, voltage regulation is achieved only when the power efficiency is low. To achieve output voltage regulation in SC converters, control methods such as pulse width modulation (PWM) control, pulse frequency modulation (PFM) control, bang-bang control, quasi-switched-capacitor control, and linear control have been applied [6]-[15]. However, no matter which control method is adopted, the operation of SC converters with capacitors at partially-charged state results in an inherent loss of power efficiency [8], [16].

In theory, the efficiency ($\eta$) of an SC converter is $$\eta = \frac{V_o}{M \cdot V_{in}},$$

where $V_o$ is the output voltage, $V_{in}$ is the input voltage, and M is the voltage gain, which is determined by the topology of the SC converters [8]. A larger deviation of the output voltage $V_o$ from the voltage $M \cdot V_{in}$ leads to a larger drop of the efficiency of the SC converters. A method to improve the efficiency of an SC converter by combining the SC converter with a configurable voltage conversion process to make the voltage $M \cdot V_{in}$, closer to the desired output voltage has been proposed, along with a voltage regulation control process [17]. However, the number of configurations of the SC converter that can be achieved with this approach is small, which limits its application. Reconfigurable SC converters have been proposed, but the number of conversion ratios is limited [19], [41]-[53]. This in turns limit the regulation property of the converter. A unified SC converter has been proposed that can achieve alternating current (AC)—direct current (DC), DC-DC, DC-AC, and AC-AC conversions, and that contains more than 500 conversion ratios [18]. However, this converter requires a large number of switches and capacitors, and this large number of conversion ratios makes the control complex. An SC converter having two variable cascaded SC circuits that achieves variable conversion gain has been proposed [20]. However, due to its cascaded connection, the conversion efficiency is not high. A regulated SC converter with an auxiliary low-drop-out (LDO) converter has been proposed [21]. The SC converter has a fixed conversion ratio, and the SC converter's two input ports are connected to the power source and an LDO output. The regulation of this SC converter's output voltage is conducted via the control of the output voltage of the LDO converter. However, this regulated SC converter is only applicable for step-down conversion, and the conversion ratio must be higher than 0.5. An LDO converter in the related art can be connected in parallel to an SC converter [36]-[39]. The output voltage of the SC converter is controlled by the LDO circuit, and the power is mainly transferred through the SC converter. However, the SC conversion ratio of this SC converter is still low as the LDO controlled output voltage makes the output voltage deviate from the inherent conversion voltage $MV_{in}$.

BRIEF SUMMARY

Addressing the drawbacks of the related art converters discussed above, embodiments of the subject invention provide switched capacitor (SC) converters that can achieve excellent voltage regulation with high conversion efficiency and that are suitable for a wide range of applications, as well as methods of deriving, fabricating, and using such SC converters. An SC converter can include at least two SC sub-circuits, and at least one of these SC sub-circuits can be of variable gain. One SC sub-circuit can convert the input voltage of the SC converter to an output voltage close to the desired output voltage value for the SC converter. Another SC sub-circuit having variable gain can convert the input voltage to an output voltage with a high resolution of small discrete voltage steps, which can control the overall output voltage to follow very closely the desired output voltage.

In an embodiment, an SC converter system can comprise at least two SC sub-circuits with their output voltages connected in series. The at least two SC sub-circuits can comprise: a first SC sub-circuit that has a variable voltage conversion gain such that an output voltage of the first SC sub-circuit can be dynamically varied with tight voltage control; and a second SC sub-circuit. The second SC sub-circuit can be configured to convert an input voltage of the SC converter system to an output voltage based on a predetermined desired output voltage value of the SC converter (e.g., an output voltage close to the desired output voltage value for the SC converter).

In a further embodiment, each SC sub-circuit can comprise at least one SC core cell comprising an input port, a ground node, and two identical units connected in cascade. Each identical unit can comprise: a capacitor; two fully-controllable unidirectional switches respectively connected to two ends of the capacitor to a positive node of the input port of the SC core cell unit; and a fully-controlled bidirectional switch connecting one end of the capacitor to the ground node of the SC core cell. In yet a further embodiment, each core cell may include no additional capacitors (i.e., only the one capacitor), no additional unidirectional switches (i.e., only the two unidirectional switches), and no additional bidirectional switches (i.e., only the one bidirectional switch).

DETAILED DESCRIPTION

Figure 1A:
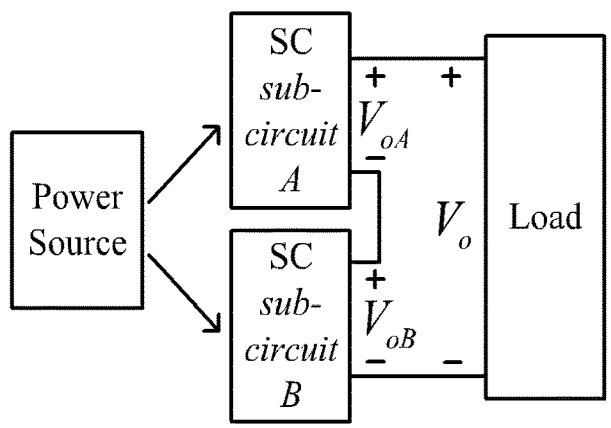
FIG. 1A shows a block diagram of a switched-capacitor (SC) converter according to an embodiment of the subject invention.

Embodiments of the subject invention provide switched capacitor (SC) converters that can achieve excellent voltage regulation with high conversion efficiency and that are suitable for a wide range of applications, as well as methods of deriving, fabricating, and using such SC converters. An SC converter can include at least two SC sub-circuits, and at least one of these SC sub-circuits can be of variable gain. The function of one SC sub-circuit can be to convert the input voltage of the SC converter to an output voltage close to the desired output voltage value for the. SC converter. The function another SC sub-circuit having variable gain can be to convert the input voltage to an output voltage with a high resolution of small discrete voltage steps, which can control the overall output voltage to follow very closely the desired output voltage. In some embodiments, an SC converter can include a plurality of modules (e.g., a "first" SC module, a "last" SC module, and optionally one or more "extend" SC modules), and each module can include a core cell and one or more additional structures connected to the core cell (see also, e.g., FIGS. 7A-7F, 8A-8C, and 9). Such an SC converter can operate in, for example, two modulation states.

Current commercial power supplies are mainly inductor/transformer-based converters. These converters are heavy and bulky due to the requirement for magnetic elements in their circuits, and therefore cannot achieve maximum power density. The weight and size can be reduced by increasing the switching frequency of the inductor/transformer-based converter. However, this results in significant switching power loss and magnetic core losses, which not only reduces the overall power conversion efficiency but may introduce a thermal issue to the product as well.

The SC power converters of embodiments of the subject invention do not include an inductor/transformer-based component. Instead, the architecture of the power supply is based on one or more SC converters, which are known for being lightweight, being small in size, and having high power density. The only power components in such a power supply are switches and capacitors, both of which are small and lightweight. Moreover, it is possible to fabricate all the switches into an integrated circuit (IC) semiconductor chip, which can further reduce the size, weight, and -importantly- the cost of the converter.

In many embodiments, the power supply is formed by SC converters that are all operating in a nearly fully-charged state (or in some cases a fully-charged state). This means that the flying capacitors connected to the power source, to one another, and to the load are always nearly fully charged (or in some cases fully-charged). Eventually, the output voltage $V_o$ of the power supply is close to the inherent conversion voltage $MV_{in}$ of the SC topology. Therefore, the efficiency ($\eta$) achievable with the power supply is close to 100%, i.e., $$\eta = \frac{V_o}{MV_{in}} \approx 1,$$

where $V_o$ is the output voltage, $V_{in}$ is the input voltage, and M is the voltage gain determined by the topology of the SC converter(s). The power supply can include at least two SC sub-circuits, and at least one of these SC sub-circuits can be of variable gain. The function of one sub-circuit is to convert the input voltage to an output voltage close to the desired output voltage value. The function of the other sub-circuit, which has variable gain, is to convert the input voltage to an output voltage with a high resolution of small discrete voltage steps, which will control the overall output voltage to follow very closely the desired output voltage.

Figure 1B:
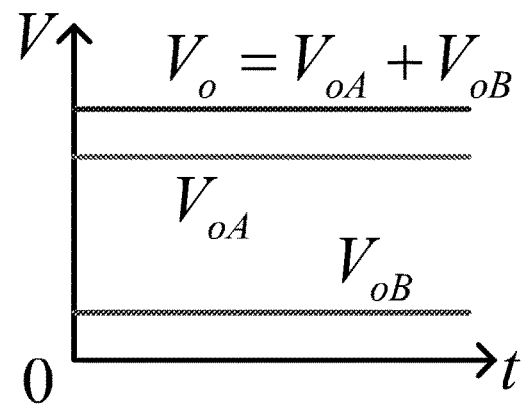
FIG. 1B shows a plot of the expected output voltage waveforms versus time for the SC converter of FIG. 1A.
Figure 1C:
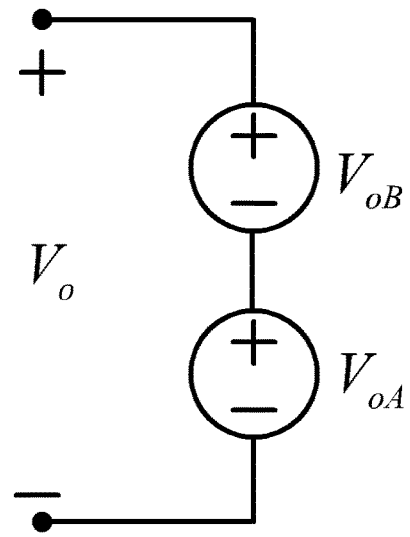
FIG. 1C shows a block diagram of output voltage for the SC converter of FIG. 1A.

FIG. 1A shows a block diagram of an SC converter according to an embodiment of the subject invention, demonstrating the principle of forming the SC converter. FIG. 1B shows a plot of the expected output voltage waveforms versus time for the SC converter of FIG. 1A, and FIG. 1C shows a block diagram of output voltage for the SC converter of FIG. 1A. Referring to FIGS. 1A-1C, a regulated SC converter can include at least two SC sub-circuits. The output voltage of the regulated SC converter is a summation of the output voltages of the two SC sub-circuits A and B, i.e., $$V_o = V_{oA} + V_{oB}, \quad (1)$$

where $V_{oA}$ and $V_{oB}$ are the output voltages of the SC sub-circuits A and B, respectively. Hence, the converter's voltage-conversion ratio is $$M = M_{oA} + M_{oB}, \quad (2)$$

where $$M = \frac{V_0}{V_{in}}, \; M_{oA} = \frac{V_{oA}}{V_{in}}, \; \text{and} \; M_{oB} = \frac{V_{oB}}{V_{in}}$$

are the SC converter's voltage-conversion ratio, SC sub-circuit A's ratio, and SC sub-circuit B's ratio, respectively. Though FIGS. 1A-1C depict a block diagram and voltage information for two SC sub-circuits, this is for demonstrative purposes only and should not be construed as limiting to only two SC sub-circuits. Instead, at least two SC sub-circuits can be present, with the same principles being applicable.

To achieve regulation of the output voltage, at least one SC sub-circuit of the converter should be of a variable and controllable output, of which its conversion ratio must be sufficiently high to meet the output voltage regulation requirement of the converter. In various embodiments of the subject invention, six main types of regulated SC converters can be used; these types can be referred to as Type I, Type II, Type III, Type IV, Type V, and Type VI for convenience, and certain characteristics thereof are summarized in Table 1. Embodiments are not necessarily limited to these six types of regulated SC converters.

TABLE 1

Main types of SC sub-circuit arrangements:

| Types | Conversion Ratio of SC sub-circuits | Regulation range |
|---|---|---|
| Type I | Sub-circuit A is constant; Sub-circuit B has variableratio. | Narrow |
| Type II | Both sub-circuits have variableratio; One sub-circuit has large variablevalue; The other sub-circuit has small variablevalue; | Wide |
| Type III | Sub-circuit A is constant; Sub-circuit B has variableratio. Sub-circuit B finely tunes the overall $V_o$; | Narrow |
| Type IV | Both sub-circuits have variableratio; Sub-circuit A coarsely tunes the overall $V_o$; Sub-circuit B finely tunes the overall $V_o$; | Wide |
| Type V | Sub-circuit A is constant but has multiple output; Sub-circuit B has variableratio and connect to different output of sub-circuit A; Sub-circuit B finely tunes the overall $V_o$; | Wide |
| Type VI | (Combination of Type 3, 4 or 5 with Type 1 or 2) | — |

Figure 2A:
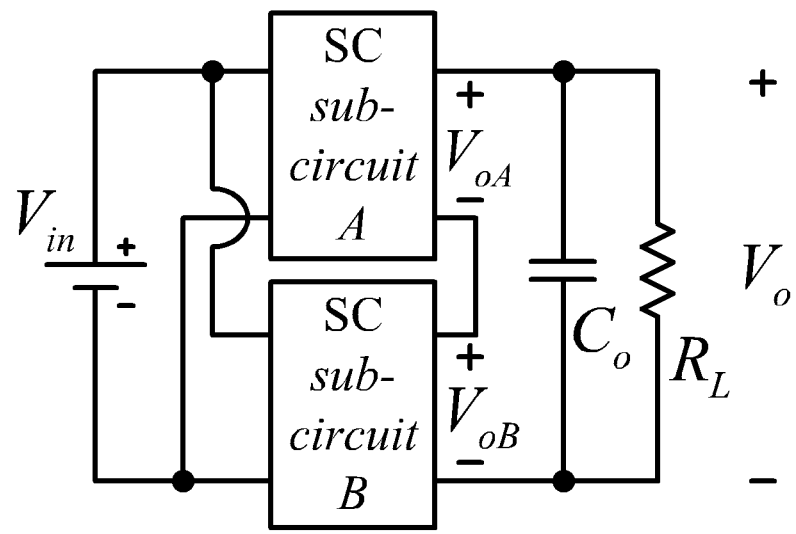
FIG. 2A shows a block diagram of a regulated SC converter according to an embodiment of the subject invention.
Figure 2B:
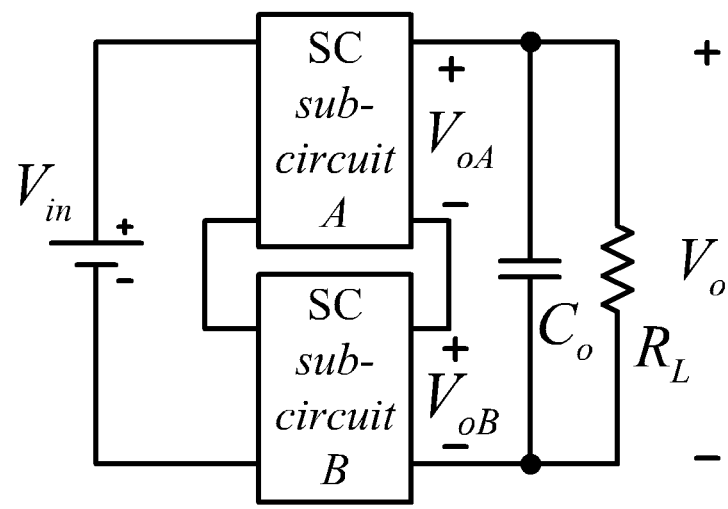
FIG. 2B shows a block diagram of a regulated SC converter according to an embodiment of the subject invention.

FIG. 2A shows a block diagram of a Type I regulated SC converter, and FIG. 2B shows a block diagram of a Type II regulated SC converter. Referring to FIG. 2A, in the Type I configuration, one SC sub-circuit can be operated to keep a constant voltage conversion ratio, while the other SC sub-circuit can be operated to achieve a variable conversion ratio. In general, the regulation range of this converter type is narrow. Referring to FIG. 2B, in the Type II configuration, both SC sub-circuits have variable conversion ratios. Their conversion ratios can be very distinct from one another. One SC sub-circuit can have a small variable conversion ratio that allows coarse ratio tuning while the other can have a relatively large variable conversion ratio that allows fine ratio tuning. By combining the two conversion ratios, the overall conversion ratio of the SC converter can be tightly regulated. The regulation range of this type of converter is wide.

Figure 3A:
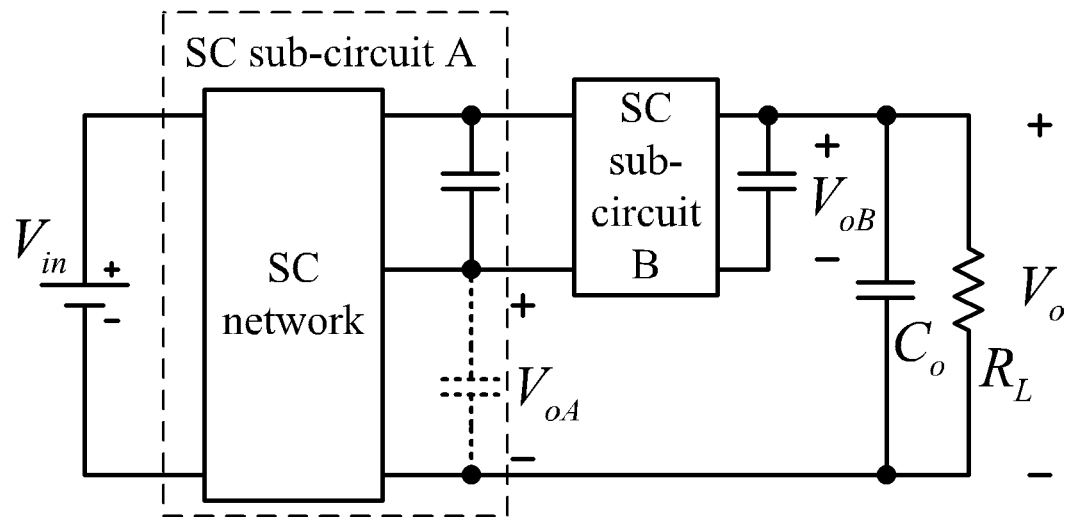
FIG. 3A shows a block diagram of a regulated SC converter according to an embodiment of the subject invention.

FIG. 3A shows a block diagram of a Type III or Type IV regulated SC converter. Referring to FIG. 3A, in the Type III configuration, SC sub-circuit A can be operated at a constant conversion ratio and SC sub-circuit B can be operated at a variable conversion ratio. Varying SC sub-circuit B's ratio finely tunes the conversion ratio of the converter's output voltage. The regulation range of this type of converter is relatively narrow. In addition, the block diagram of FIG. 3A can also represent a Type IV regulated SC converter. In the Type IV configuration, both the SC sub-circuits are of variable conversion ratio. Varying SC sub-circuit A's ratio coarsely can tune the converter's output voltage, and varying SC sub-circuit B's ratio can finely tune the converter's output voltage. The regulation range of this converter type is wide.

Figure 3B:
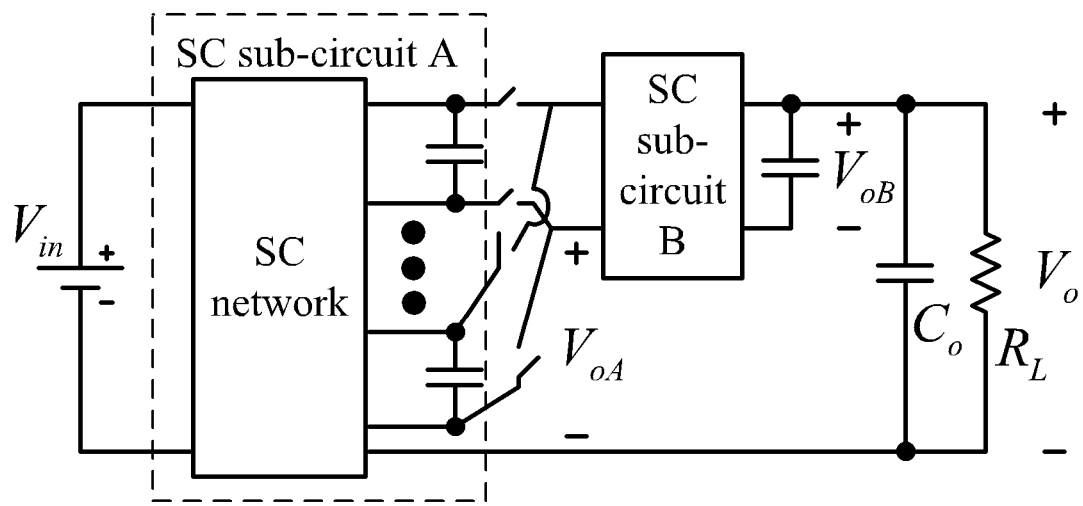
FIG. 3B shows a block diagram of a regulated SC converter according to an embodiment of the subject invention.

FIG. 3B shows a block diagram of a Type V regulated SC converter. Referring to FIG. 3B, in the Type V configuration, SC sub-circuit A can be operated at a constant conversion ratio, and SC sub-circuit B, which is connected to different output ports of SC sub-circuit A via the control of different active switches, can be operated at a variable conversion ratio. By varying the connection of SC sub-circuit B to SC sub-circuit A, the output voltage of the converter can be coarsely tuned. Varying the ratio of SC sub-circuit B can finely tune the converter's output voltage. The regulation range of this type is wide.

The Type VI regulated SC converter can be a combination of Type III, Type IV, or Type V with Type I or Type II.

Figure 4:
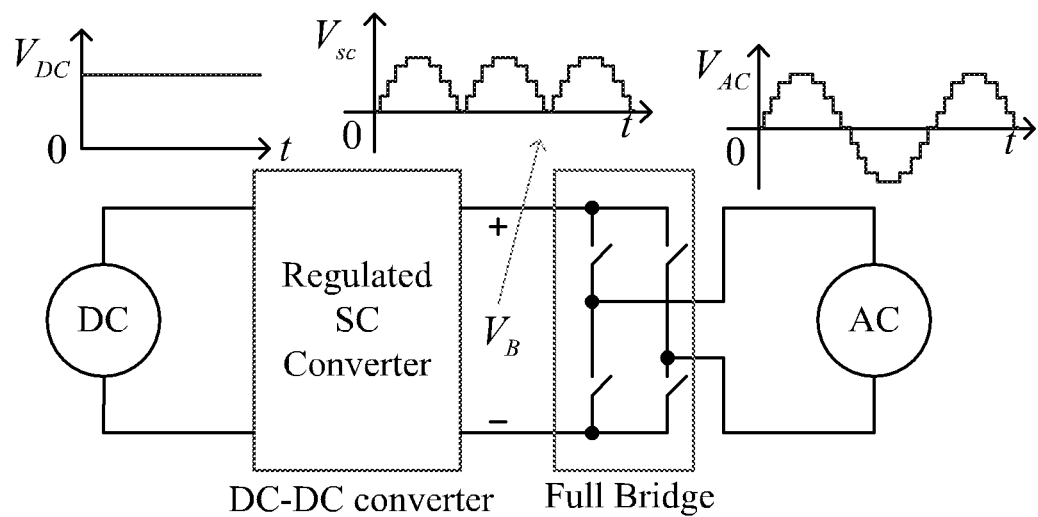
FIG. 4 shows a block diagram of an SC inverter according to an embodiment of the subject invention.

In an embodiment, with the addition of a full-bridge circuit, a regulated SC converter as described herein can be used as an alternating current (AC) inverter. FIG. 4 shows a block diagram of an SC inverter based on SC converters. Any of types II, IV, V, and VI SC converters can achieve a series of small discrete ratios with high resolution. If the conversion ratio of the regulated SC converter is controlled to achieve a voltage waveform $V_B$ with AC envelope as shown in FIG. 4, and the waveform is then inverted through a full-bridge circuit, an AC output voltage is attainable. For this inverter, the switching frequency of the full-bridge circuit can be equal to the line frequency of the AC output voltage.

Figure 5:
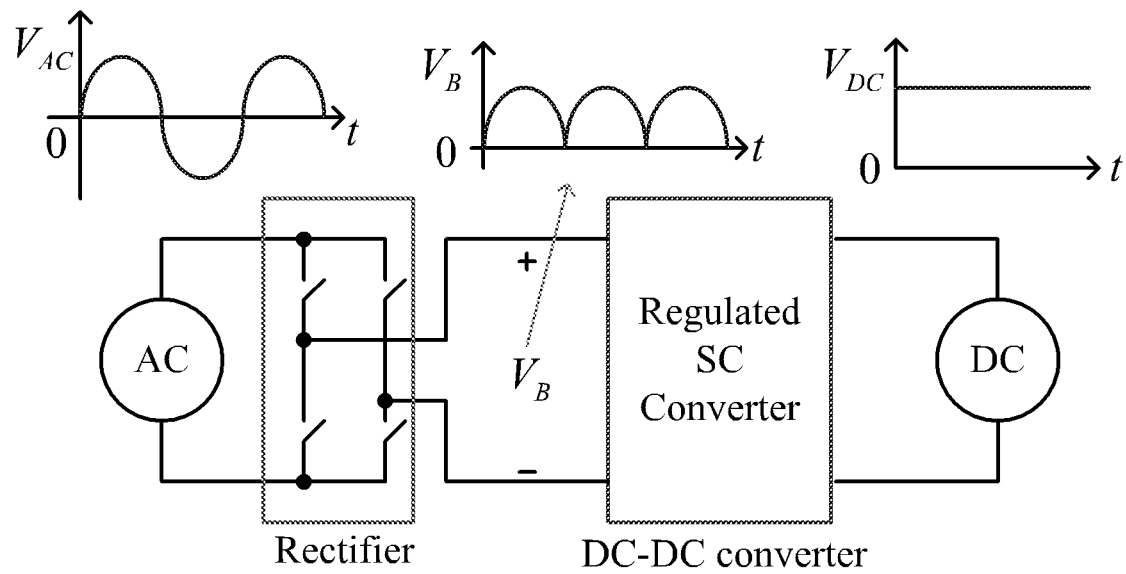
FIG. 5 shows a block diagram of an SC rectifier according to an embodiment of the subject invention.

In an embodiment, with the inclusion of the full-bridge circuit, a regulated SC converter as described herein can be used as an AC-direct current (DC) rectifier. FIG. 5 shows a block diagram of an SC rectifier based on SC converters. Referring to FIG. 5, the AC input voltage can be rectified by a full-bridge circuit, and the waveform of $V_B$ as shown in FIG. 5 can be obtained. A sensor circuit may be required to detect the voltage value of $V_B$. According to this voltage value and the required output voltage, the conversion ratio of each switching period of the SC converter can be calculated. By using this calculated conversion ratio to control the regulated SC converter, a DC output voltage can be obtained. If active switches are used in the full-bridge rectifier, the switching frequency is equal to the line frequency of the AC input voltage.

Figure 6:
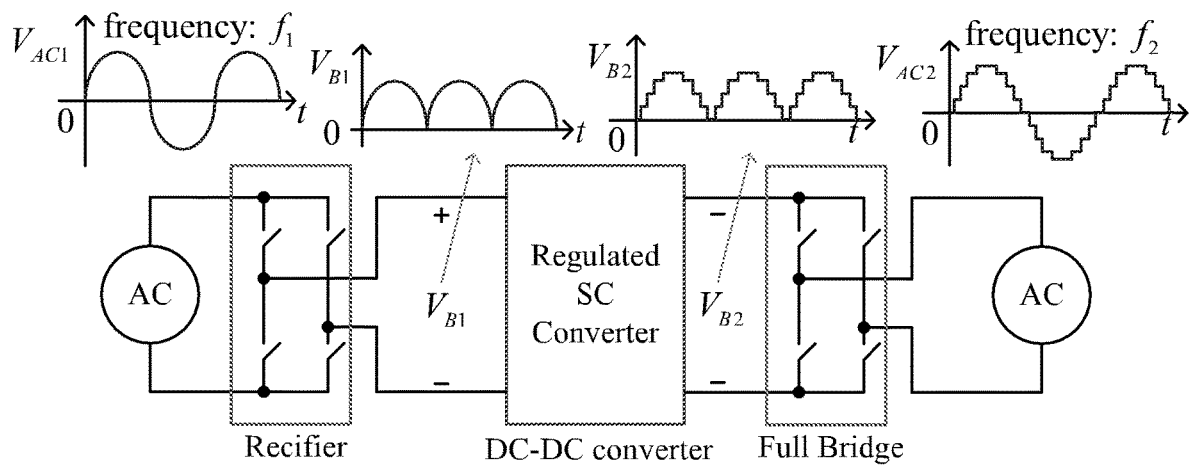
FIG. 6 shows a block diagram of a regulated SC alternating current (AC)-AC converter according to an embodiment of the subject invention.

In an embodiment, an inverter and a rectifier (e.g., as shown in FIGS. 4 and 5) can be combined to obtain a regulated SC AC-AC converter. FIG. 6 shows a block diagram of an SC AC-AC converter based on SC converters as described herein.

Figure 7A:
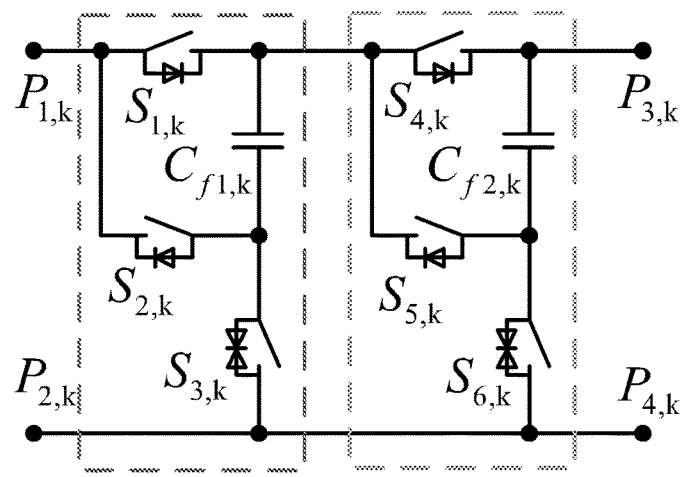
FIG. 7A shows a block diagram of a core cell of a module of a regulated SC converter according to an embodiment of the subject invention.
Figure 7B:
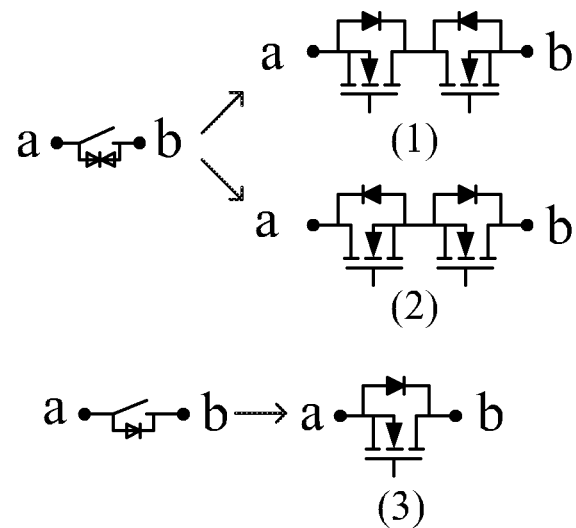
FIG. 7B shows a block diagram of switches of a module of a regulated SC converter according to an embodiment of the subject invention.
Figure 7C:
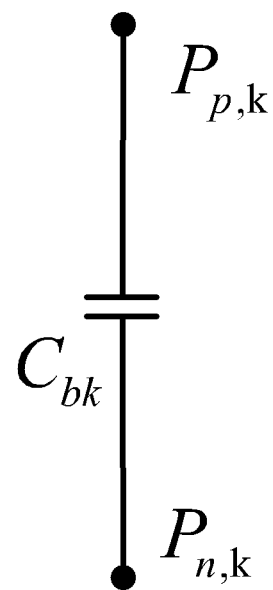
FIG. 7C shows a block diagram of a capacitor of a module of a regulated SC converter according to an embodiment of the subject invention.
Figure 7D:
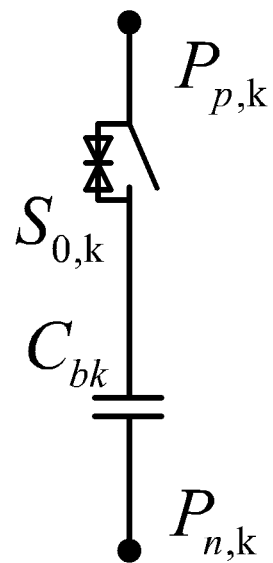
FIG. 7D shows a block diagram of a capacitor with a switch of a module of a regulated SC converter according to an embodiment of the subject invention.
Figure 7E:
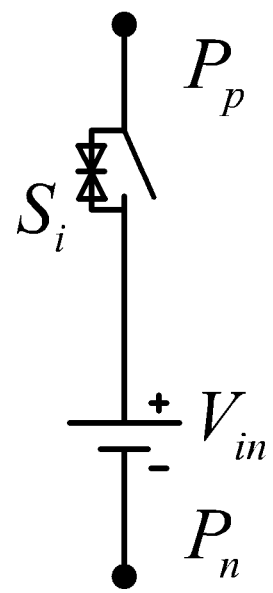
FIG. 7E shows a block diagram of an input structure of a module of a regulated SC converter according to an embodiment of the subject invention.
Figure 7F:
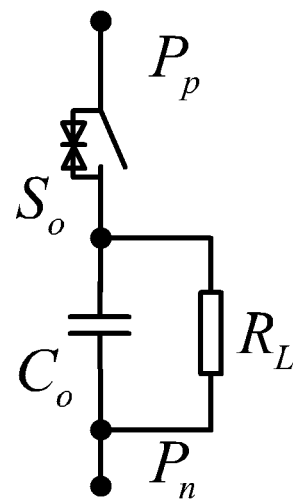
FIG. 7F shows a block diagram of an output structure of a module of a regulated SC converter according to an embodiment of the subject invention.
Figure 8A:
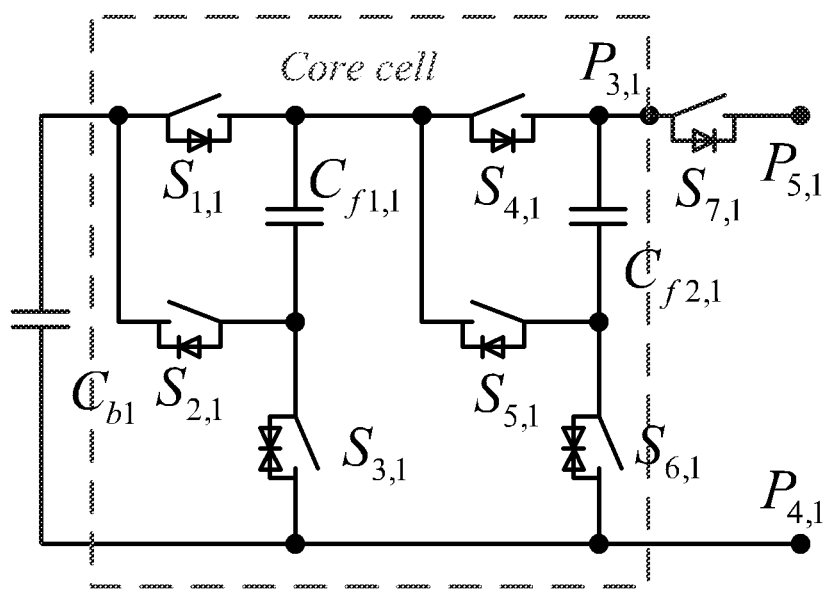
FIG. 8A shows a block diagram of the circuit topology of a module of a regulated SC converter according to an embodiment of the subject invention.
Figure 8B:
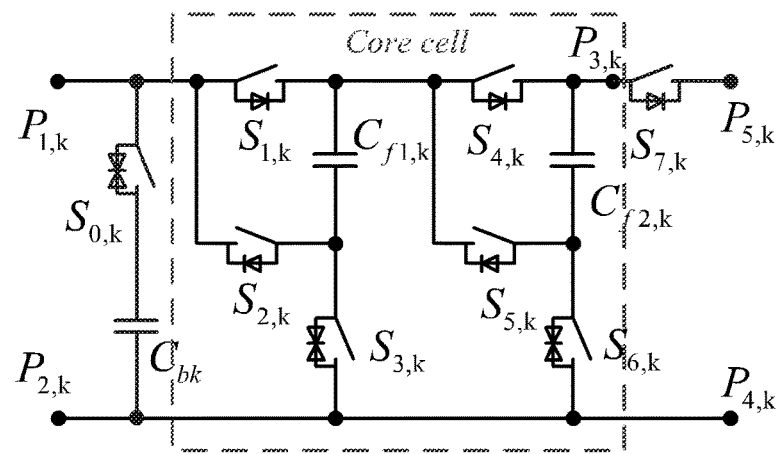
FIG. 8B shows a block diagram of the circuit topology of a module of a regulated SC converter according to an embodiment of the subject invention.
Figure 8C:
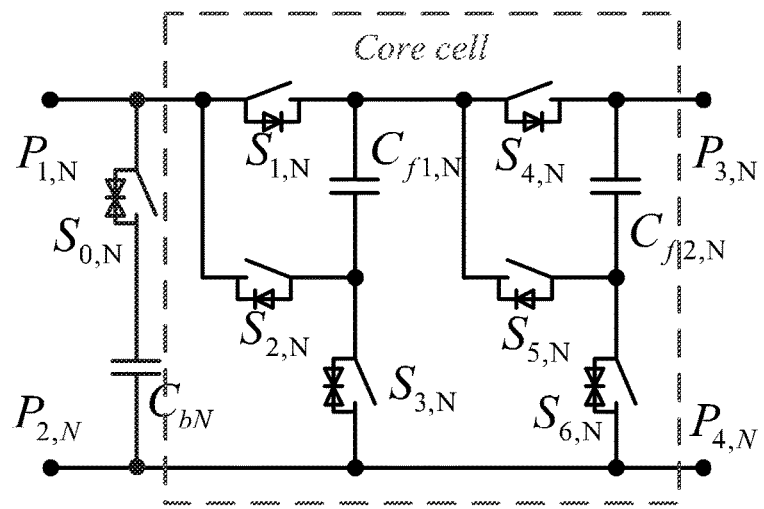
FIG. 8C shows a block diagram of the circuit topology of a module of a regulated SC converter according to an embodiment of the subject invention.
Figure 9:
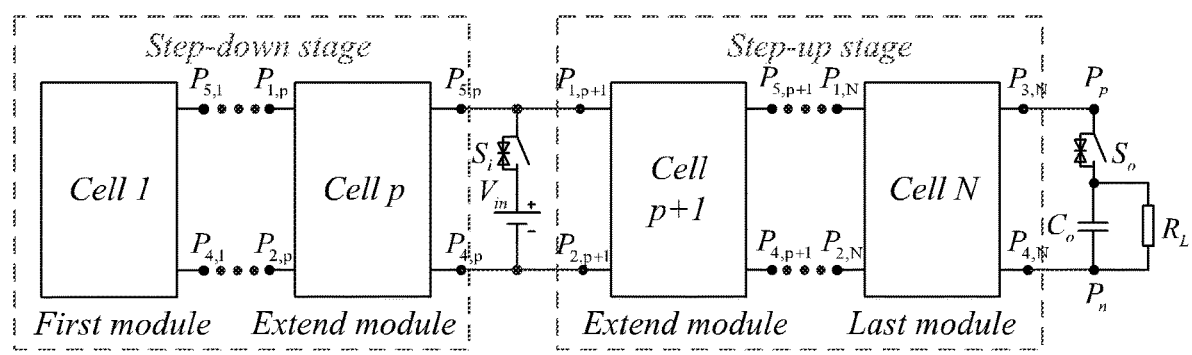
FIG. 9 shows a block diagram of the circuit topology of a regulated SC converter according to an embodiment of the subject invention.

FIG. 9 shows a block diagram of the circuit topology of a regulated SC converter according to an embodiment of the subject invention. Referring to FIG. 9, the circuit topology can comprise three types of modules, which can each be obtained by connecting a core cell as shown in FIG. 7A with one or more additional structures depicted in FIGS. 7C-7F. This can give a first SC module, an extension module, and a last SC module, as shown in FIGS. 8A, 8B, and 8C, respectively.

Referring to FIG. 8A, the first SC module can be constructed by connecting a capacitor (FIG. 7C) to the ports $P_{1,k}$ and $P_{2,k}$ of the core cell (FIG. 7A), and connecting a switch (e.g., the switch labeled "3" in FIG. 7B) to the port $P_{3,k}$ of the core cell. Referring to FIG. 8B, the extension module can be constructed by connecting the structure shown in FIG. 7D to the ports $P_{1,k}$ and $P_{2,k}$ of the core cell (FIG. 7A) and by connecting a switch (e.g., the switch labeled "3" in FIG. 7B)to the port $P_{3,k}$ of the core cell. Referring to FIG. 8C, the last module can be constructed by connecting the structure shown in FIG. 7D to the ports of $P_{1,k}$ and $P_{2,k}$ of the core cell (FIG. 7A).

The converter of FIG. 9 can include one first SC module, (N-2) extension modules, and one last SC module, where N is an integer. The input structure (FIG. 7E) and the output structure (FIG. 7F) can be connected to ports $P_{1,k}$ and $P_{2,k}$ of any extension module or the last module, or ports $P_{3,k}$ and $P_{4,k}$ of the last module. In this converter, modules 1 . . . p form the step-down stage that performs the voltage step-down conversion, and modules p+1 . . . N form the step-up stage that performs the voltage step-up conversion. The output voltage of the converter is the summation of the output voltages of the step-up stage and the step-down stage.

The operation of the converter can be divided into two modulation states. The first modulation state is to charge all the capacitors to their own fixed voltages. In this modulation state, each module can be independently controlled and have its own operation state. In the second modulation state, all the modules of both the step-up stage and step-down stage can be stacked (series) connected and discharged to the load.

The output voltage of the converter can be controlled through the setting of the voltage of each module, which is dependent on the capacitors that are series-connected to ports $P_{1,k}$ and $P_{3,k}$ of each core cell. The core cell can achieve both step-up conversion by connecting the power source to ports $P_{1,k}$ and $P_{2,k}$, and step-down conversion by connecting the power source to ports $P_{3,k}$ and $P_{4,k}$. The power source of each module can either be a DC power supply or a capacitor $C_{b(k+1)}$ of the module k+1. Also, the power supply of the SC converter can be directly connected to capacitor $C_{b(p+1)}$.

Referring again to FIG. 9, in the first modulation state, $S_i$ is turned on and $S_a$ is turned off. In the second modulation state, $S_i$ is turned off and $S_a$ is turned on.

Figure 10A:
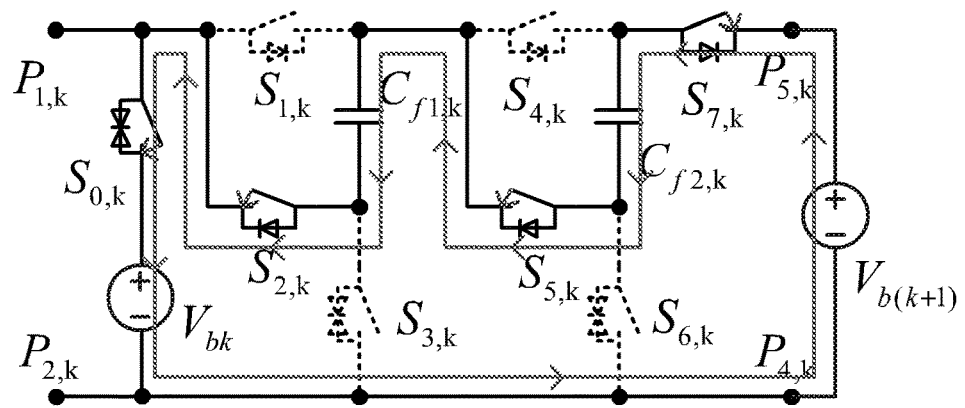
FIG. 10A shows a block diagram of a switching state of a regulated SC converter according to an embodiment of the subject invention.
Figure 10B:
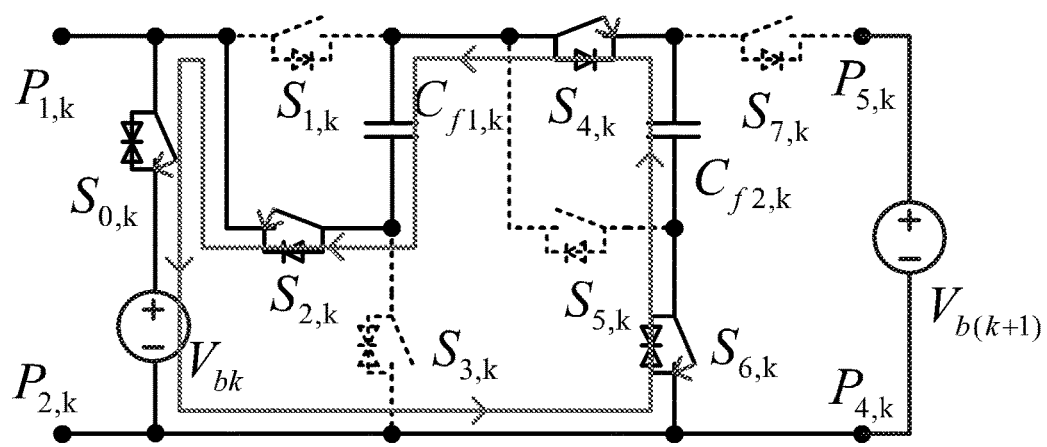
FIG. 10B shows a block diagram of a switching state of a regulated SC converter according to an embodiment of the subject invention.
Figure 10C:
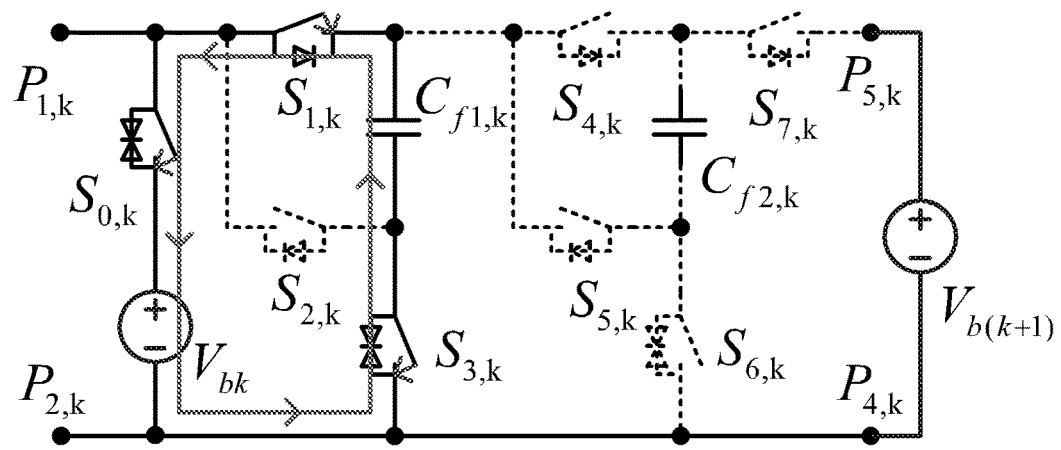
FIG. 10C shows a block diagram of a switching state of a regulated SC converter according to an embodiment of the subject invention.

In more detail, in the modulation state, each module can have its independent switching states. While all modules can be in different switching states, they can have three common switching states as depicted in FIGS. 10A, 10B, and 10C. That is, FIGS. 10A-10C show switching states that all the modules can have in common. The modules of the step-up and step-down stages can have different switching state orders. For demonstrative purposes regarding the operation of the three common switching states, ports $P_{4,k}$ and $P_{5,k}$ can be assumed to be connected to a voltage source $V_{b(k+1)}$, which represents the capacitor $C_{b(k+1)}$ of module k+1, and capacitor $C_{bk}$ can be replaced with a voltage source $V_{bk}$. This is for demonstrative purposes only and should not be construed as limiting. Referring to FIG. 10A, in this switching state, which can be referred to as switching state 1 for purposes of convenience only, switches $S_{2,k}$, $S_{5,k}$, $S_{7,k}$, and $S_{0,n}$ (where k=1 ... p, n=2 ... p) are turned on while all other switches are turned off. In this state, $$\begin{cases} V_{bk} + V_{f1,k} + V_{f2,k} = V_{b(k+1)} \\ V_{b(p+1)} = V_{in} \end{cases} \quad (3)$$

Referring to FIG. 10B, in this switching state, which can be referred to as switching state 2 for purposes of convenience only, switches $S_{2,k}$, $S_{4,k}$, $S_{6,k}$ and $S_{0,n}$ (where k=1 ... N, n=2 ... N are turned on while other switches are off. $C_{f2,k}$ is parallel connected with the series connected capacitors $C_{f1,k}$ and $C_{bk}$ in module k. In this state, $$V_{bk} + V_{f1,k} = V_{f2,k}. \quad (4)$$

Referring to FIG. 10C, in this switching state, which can be referred to as switching state 3 for purposes of convenience only, switches $S_{1,k}$, $S_{3,k}$, and $S_{0,n}$ (where k=1 ... N, n=2 ... N) are on while other switches are off $C_{bk}$ is parallel connected to $C_{f1,k}$. At the end of this state, $$V_{bk} = V_{f1,k}. \quad (5)$$

The operating order of the step-down stage is switching state 1, switching state 2, and then switching state 3. The current flow direction in each switching state is depicted by the pink arrows shown in FIGS. 10A-10C. The operating order of the step-up stage is switching state 3, switching state 2, and then switching state 3. The current flow direction is the reverse of that depicted by the pink arrows in FIGS. 10A-10C. After these three operating states, the voltages of the modules are where k=1 ... N.

$$\begin{cases} V_{f1,k} = V_{bk} \\ V_{f2,k} = 2 \cdot V_{f1,k} \end{cases} \quad (6)$$

According to Equations (3) and (6), the voltages of all capacitors are $$\begin{cases} V_{bk} = \dfrac{V_{in}}{4^{(p-k+1)}} \\ V_{f1,k} = \dfrac{V_{in}}{4^{(p-k+1)}} \\ V_{f2,k} = \dfrac{2 V_{in}}{4^{(p-k+1)}} \end{cases} \quad (7)$$

and $$\begin{cases} V_{bj} = 4^{(j-p-1)} V_{in} \\ V_{f1,j} = 4^{(j-p-1)} V_{in} \\ V_{f2,j} = 2^{2(j-p-1)+1} V_{in} \end{cases} \quad (8)$$

where k=1 ... p for the step-down modules 1 to p, and j=p+1 ... N for the step-up modules p+1 to N.

Figure 11A:
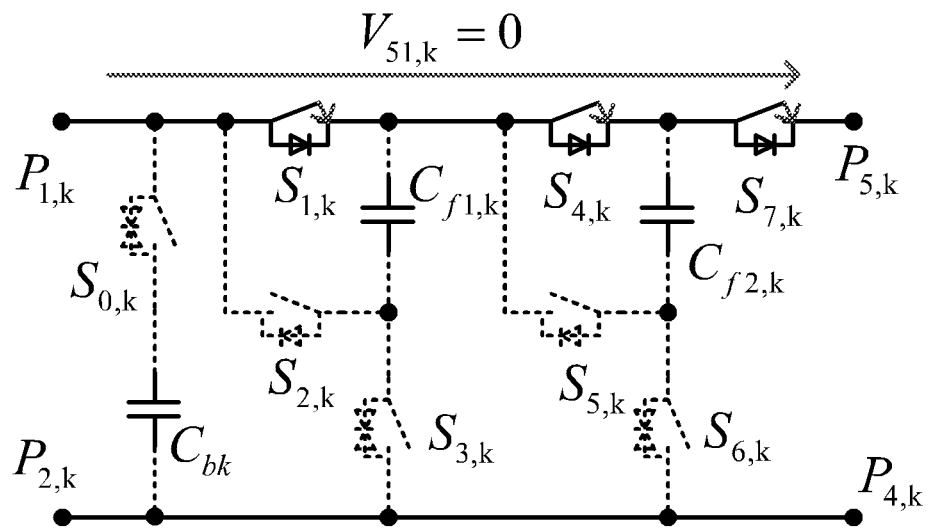
FIG. 11A shows a block diagram of output gain of a module of a regulated SC converter according to an embodiment of the subject invention, where the output voltage of the module is 0.
Figure 11B:
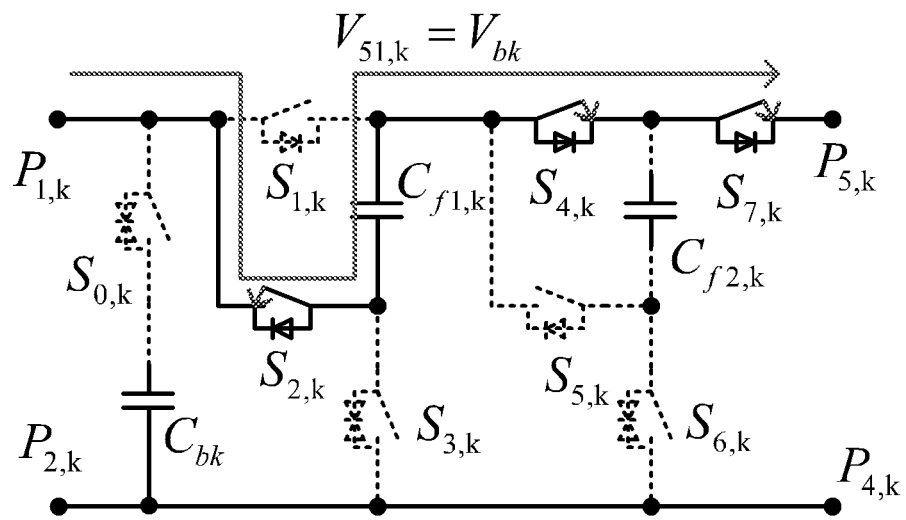
FIG. 11B shows a block diagram of output gain of a module of a regulated SC converter according to an embodiment of the subject invention, where the output voltage of the module is $V_{bk}$.
Figure 11C:
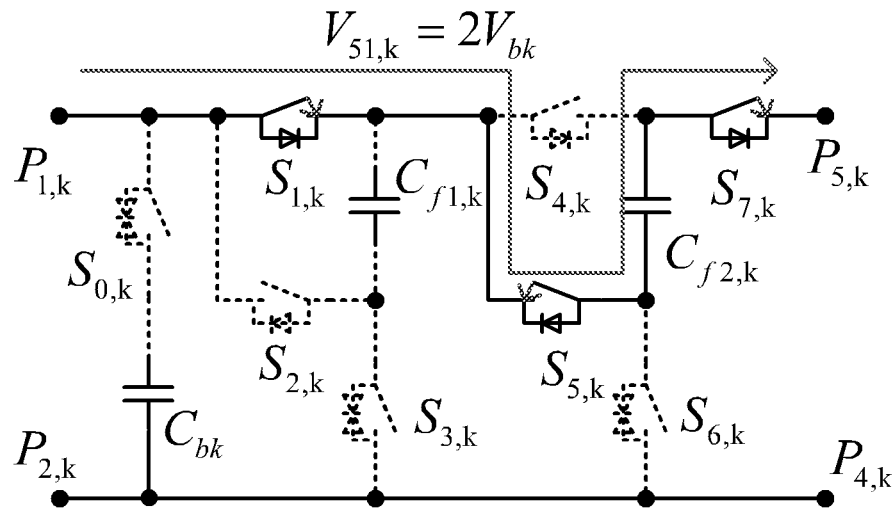
FIG. 11C shows a block diagram of output gain of a module of a regulated SC converter according to an embodiment of the subject invention, where the output voltage of the module is $2V_{bk}$.
Figure 11D:
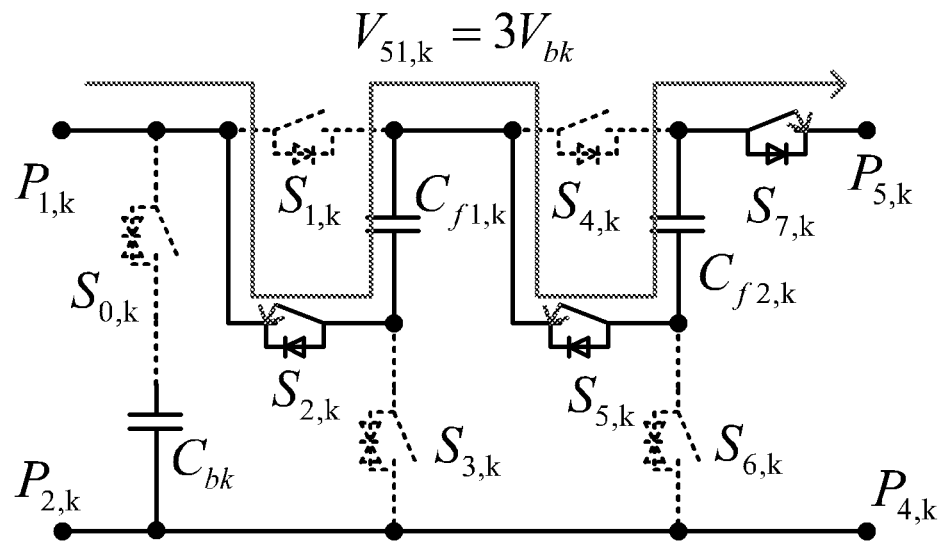
FIG. 11D shows a block diagram of output gain of a module of a regulated SC converter according to an embodiment of the subject invention, where the output voltage of the module is $3V_{bk}$.

In the second modulation state, all the modules of the step-up stage and the stage-down stage can be connected through ports $P_{1,k}$ and $P_{5,k}$, i.e., port $P_{5,k}$ can be connected to port $P_{1,(k+1)}$. Therefore, the output voltage of the SC converter can be equal to the summation of the potential of the first module $V_{5,1}$ and the total potential difference across ports $P_{1,k}$ and $P_{5,k}$(k=2 ... M), i.e., $V_{51,2}, \ldots, V_{51,M}$. The potential difference across ports $P_{1,k}$ and $P_{5,k}$ of each module has four possible output voltages depending on the connection of capacitors $C_{f1,k}$ and $C_{f2,k}$, and these four output voltages are shown in FIGS. 11A-11D. Referring to FIG. 11A, when only $S_{1,k}$, $S_{4,k}$ and $S_{7,k}$ are turned on, all the flying capacitors $C_{f1,k}$ and $C_{f2,k}$ are bypassed, and the output voltage of the module is 0. Referring to FIG. 11B, when only $S_{2,k}$, $S_{4,k}$ and $S_{7,k}$ are turned on, the flying capacitor $C_{f1,k}$ is stacked, and the output voltage of the module is $V_{bk}$. Referring to FIG. 11C, when only $S_{1,k}$, $S_{5,k}$ and $S_{7,k}$ are turned on, the flying capacitor $C_{f2,k}$ is stacked, and the output voltage of the module is $2 \cdot V_{bk}$. Referring to FIG. 11D, when only $S_{2,k}$, $S_{5,k}$ and $S_{7,k}$ are turned on, both the flying capacitors $C_{f1,k}$ and $C_{f2,k}$ are stacked, and the output voltage of the module is $3 \cdot V_{bk}$. According to Equations (7) and (8), the conversion ratio of each module is $$M_{oA} = \sum_{k=1}^{p} M_k, \quad (9)$$

where $M_k = \begin{cases} 0, & \text{only } S_{1,k}, S_{4,k}, \text{ and } S_{7,k} \text{ are on} \\ \dfrac{1}{4^{(p-k+1)}}, & \text{only } S_{2,k}, S_{4,k}, \text{ and } S_{7,k} \text{ are on} \\ \dfrac{2}{4^{(p-k+1)}}, & \text{only } S_{1,k}, S_{5,k}, \text{ and } S_{7,k} \text{ are on} \\ \dfrac{3}{4^{(p-k+1)}}, & \text{only } S_{2,k}, S_{5,k}, \text{ and } S_{7,k} \text{ are on} \end{cases}$ where k=1 ... p for the step-down modules 1 to p; and $$M_{oB} = \sum_{k=p+1}^{N} M_k, \quad (10)$$

-continued $$\text{where } M_k = \begin{cases} 0, & \text{only } S_{1,k}, S_{4,k}, \text{ and } S_{7,k} \text{ are on} \\ 4^{(p-k+1)}, & \text{only } S_{2,k}, S_{4,k}, \text{ and } S_{7,k} \text{ are on} \\ 2 \cdot 4^{(p-k+1)}, & \text{only } S_{1,k}, S_{5,k}, \text{ and } S_{7,k} \text{ are on} \\ 3 \cdot 4^{(p-k+1)}, & \text{only } S_{2,k}, S_{5,k}, \text{ and } S_{7,k} \text{ are on} \end{cases},$$

where k=p+1 . . . N for the step-up modules p+1 to N. The voltage gain of the SC converter is $$M = M_{oA} + M_{oB} = \sum_{k=1}^{N} M_k. \tag{11}$$

In the second modulation state, $M_k$ (where k=1 . . . N) can be set to make the overall conversion ratio M equivalent to the desired conversion ratio.

Referring again to FIG. 9, the SC converter has a step-up stage, which is made up of the (p+1)-th to N-th module, and a step-down stage, which is made up of the first to p-th module. The maximum voltage conversion ratio of the converter is dependent on the step-up stage and is given as $4^{N-p}$. Therefore, an increase in the number of modules of the step-up stage increases the maximum conversion ratio of the converter. The accuracy of the output voltage of the SC converter is determined by the step-down stage. The conversion ratio resolution is $$\frac{1}{4^p}.$$

An increase in the number or modules of the step-down stage can lead to a higher resolution and consequently, a more accurate voltage regulation.

When the input structure is connected to ports $P_{3,N}$ and $P_{4,N}$ of the last module, a pure step-down SC converter can be obtained. The modules p+1 . . . N step down the input voltage to a level that is close to the desired voltage. The modules 1 . . . p can accurately adjust the output voltage to the desired voltage. In addition, the accuracy of the output voltage can be determined by the number of modules p.

In some embodiments, the SC modules depicted in FIGS. 8A-8C can be applied to existing SC topologies, including but not limited to a series-parallel SC converter, a Fibonacci SC converter, and a ladder SC converter. This can enable these SC topologies to achieve good regulation, while still retaining the high efficiency characteristics of the SC topology.

Figure 15A:
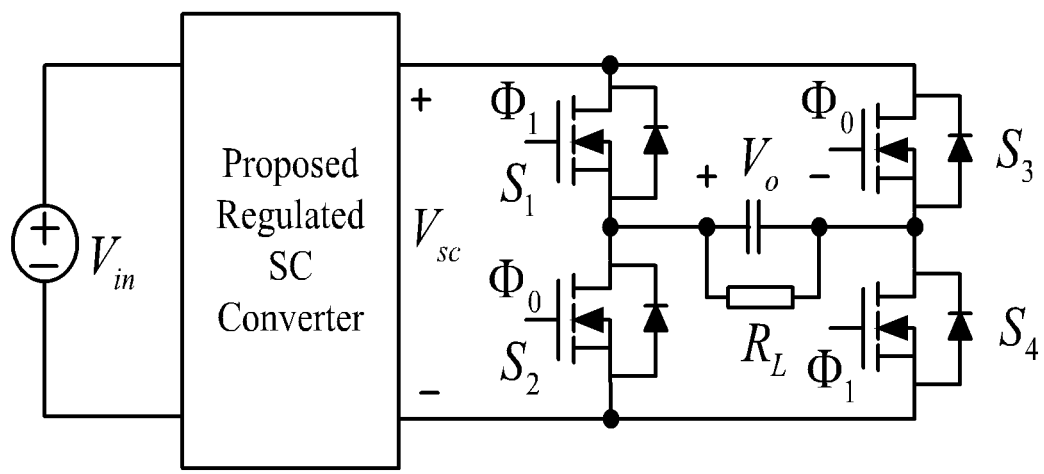
FIG. 15A shows a block diagram of the circuit topology of a direct current (DC)-AC inverter according to an embodiment of the subject invention.
Figure 15B:
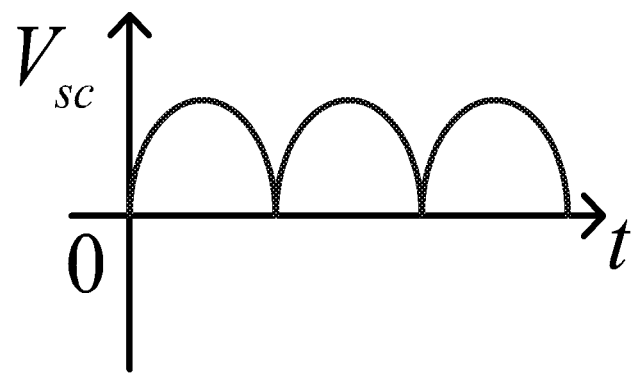
FIG. 15B shows a plot of output voltage a regulated SC converter according to an embodiment of the subject invention.

In an embodiment, the converter topology shown in FIG. 9 can be configured as a DC-AC inverter with the addition of a full-bridge circuit. FIG. 15A shows a block diagram of such a DC-AC inverter. The output voltage of the regulated SC converter can be controlled to be full-wave rectified, as shown in FIG. 15B. The switching frequency of the full-bridge circuit is equal to the AC line frequency. When the AC output voltage is higher than 0, $S_1$ and $S_4$ are turned on, and $S_2$ and $S_3$ are off. When the AC output voltage is lower than 0, $S_2$ and $S_3$ are turned on and $S_1$ and $S_4$ are turned off.

Figure 16:
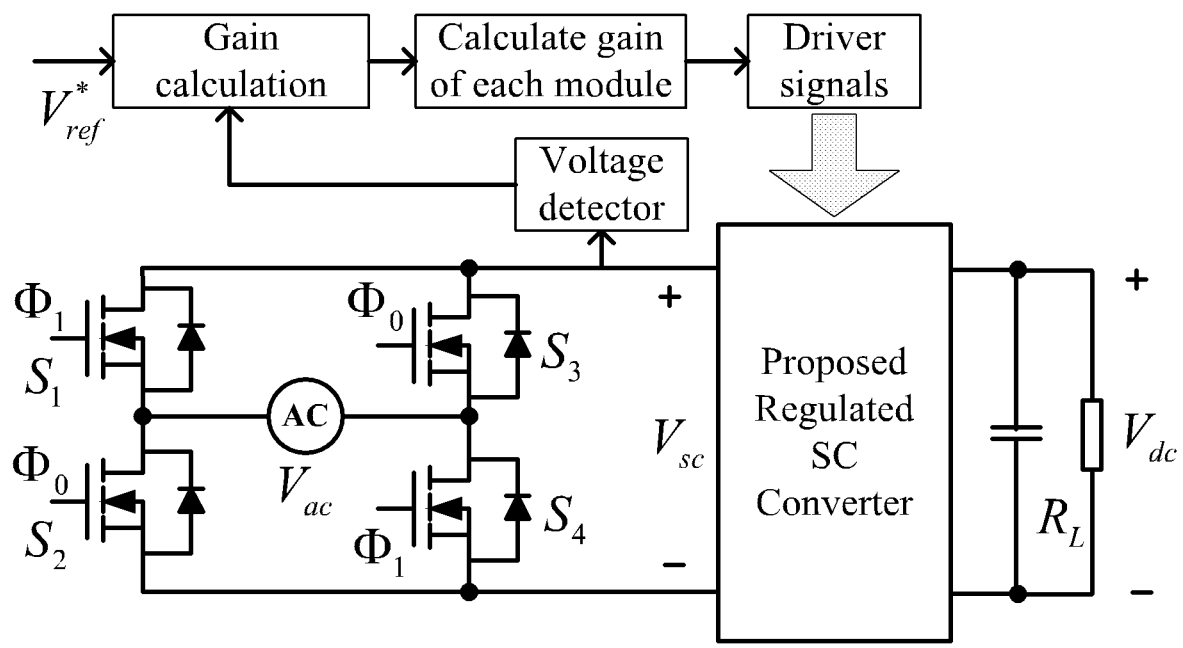
FIG. 16 shows a block diagram of the circuit topology of an AC-DC rectifier according to an embodiment of the subject invention, along with a related control block diagram.

In an embodiment, the converter topology shown in FIG. 9 can be configured as an AC-DC rectifier. FIG. 16 shows a block diagram of such an AC-DC rectifier. Referring to FIG. 16, the AC input voltage can be connected to a full-bridge circuit. The AC voltage can be rectified through $S_1$-$S_4$. When the input AC voltage is higher than zero, $S_1$ and $S_4$ are turned on, and $S_2$ and $S_3$ are turned off. When the input AC voltage is lower than zero, $S_1$ and $S_4$ are turned off, and $S_2$ and $S_3$ are turned on. Therefore, the waveform of $V_{sc}$ is similar to that shown in FIG. 15B. A voltage detector circuit can be utilized to measure the voltage value of $V_{sc}$. According to the value of $V_{sc}$ and the reference voltage $V_{ref}$, the driving signals of the respective modules of the SC converter can be calculated to drive the modules.

The regulated SC converters of embodiments of the subject invention are small and light weight, and are very suitable for portable electronics. Moreover, as the converters do not includes magnets, it is possible to fabricate the power switches and their associated driver circuits into a single IC chip, further reducing the size and weight of the converter. Embodiments of the subject invention are advantageous in many contexts, including in applications where weight and size are of prime concern.

Embodiments of the subject invention can also be used in conjunction with renewable energy resources. The voltage of devices in renewable energy sources (e.g., photovoltaic (PV) panel, fuel cell (FC), thermoelectric generator (TEG), and battery storages) is DC and changes in amplitude when the operation conditions change. DC-DC converters are required to convert the voltage of the renewable sources to a suitable level that meets the load requirement. Regulated SC converters of embodiments of the subject invention can advantageously be used in such applications.

The regulated SC converters of embodiments of the subject invention have several advantages over conventional power converters. Unlike the converters of [20], SC converters of embodiments of the subject invention can be one stage converters, and the variable circuit can be configured to deal with only a small portion of the power flow. Therefore, the efficiency of the converters can be higher than those of [20]. In addition, unlike the converters of [21], regulated SC converters of embodiments of the subject invention can achieve all conversion ratios. Moreover, while converters of [22]-[24], [35], [40], and [41]-[53] possess very limited regulation ability, regulated SC converters of embodiments of the subject invention can achieve good load regulation and line regulation. Further, the regulated SC converters of embodiments of the subject invention are more efficient than those of [25]-[34], [36]-[39], and [54].

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

Figure 12A:
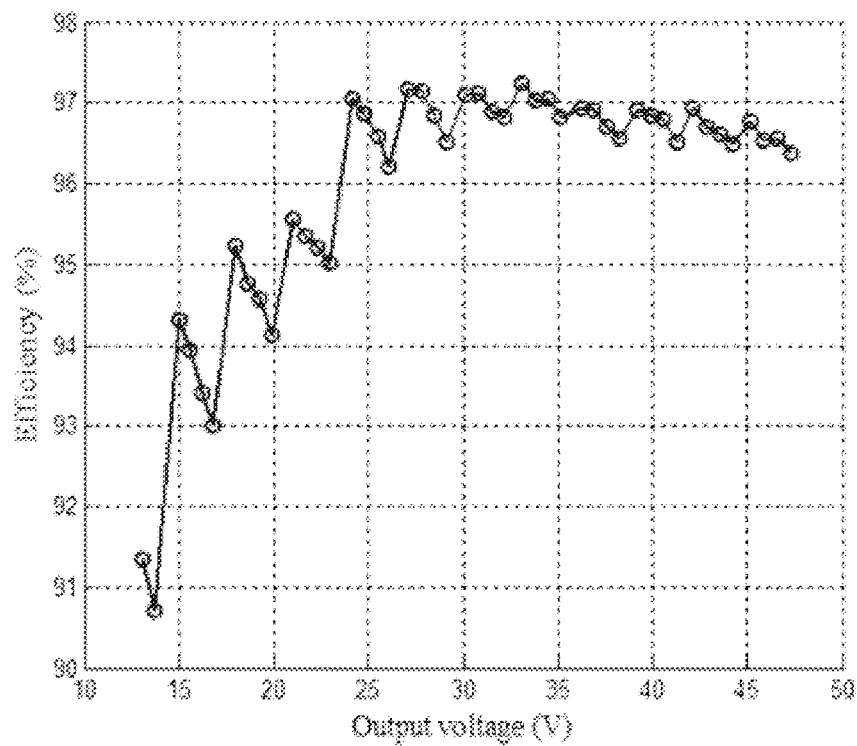
FIG. 12A shows a plot of efficiency versus output voltage for a step-up SC converter according to an embodiment of the subject invention, where the output power is 50 Watts (W), the input voltage is 12 V, and the switching frequency is 100 kilo-Hertz (kHz).
Figure 12B:
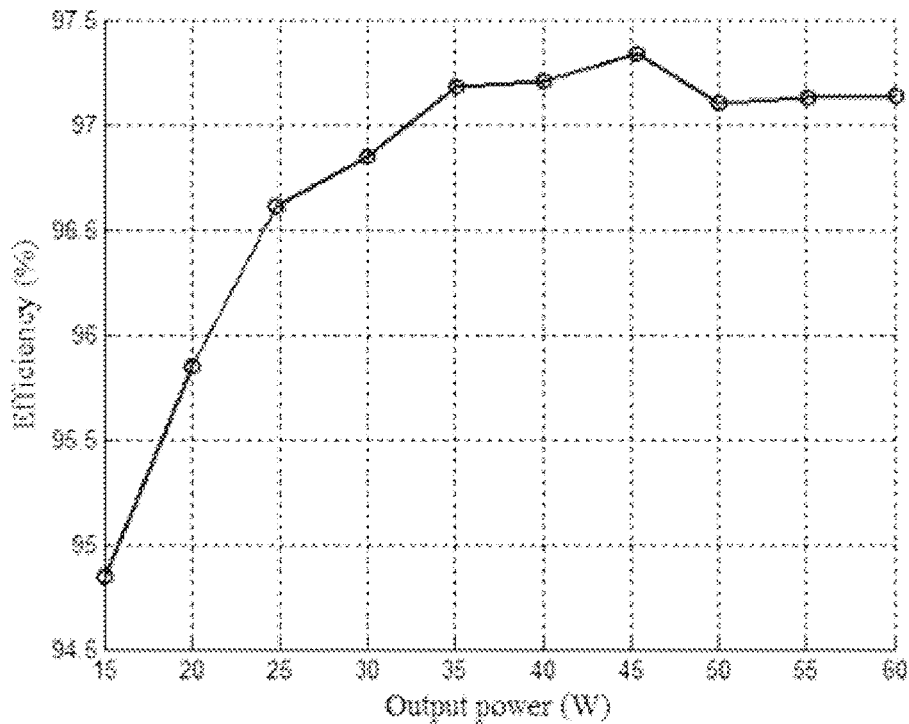
FIG. 12B shows a plot of efficiency versus output power for a step-up SC converter according to an embodiment of the subject invention, where the output voltage is 30 Volts (V) fixed, the input voltage is 12 V, and the switching frequency is 100 kHz.

A step-up SC converter composing two step-up modules and two step-down modules, based on the converter structure illustrated in FIG. 9, was simulated. The input voltage was 12 Volts (V), and the switching frequency was 100 kilo-Hertz (kHz). FIG. 12A shows a plot of the efficiency of this converter versus output voltage, with an output power of 50 Watts (W). FIG. 12B shows a plot of the efficiency versus output power with an output voltage of 30 V regulated. Referring to FIGS. 12A and 12B, the results show that the converter is of high efficiency. At 30 V fixed output voltage, the maximum efficiency is higher than 97%.

Example 2

Figure 13A:
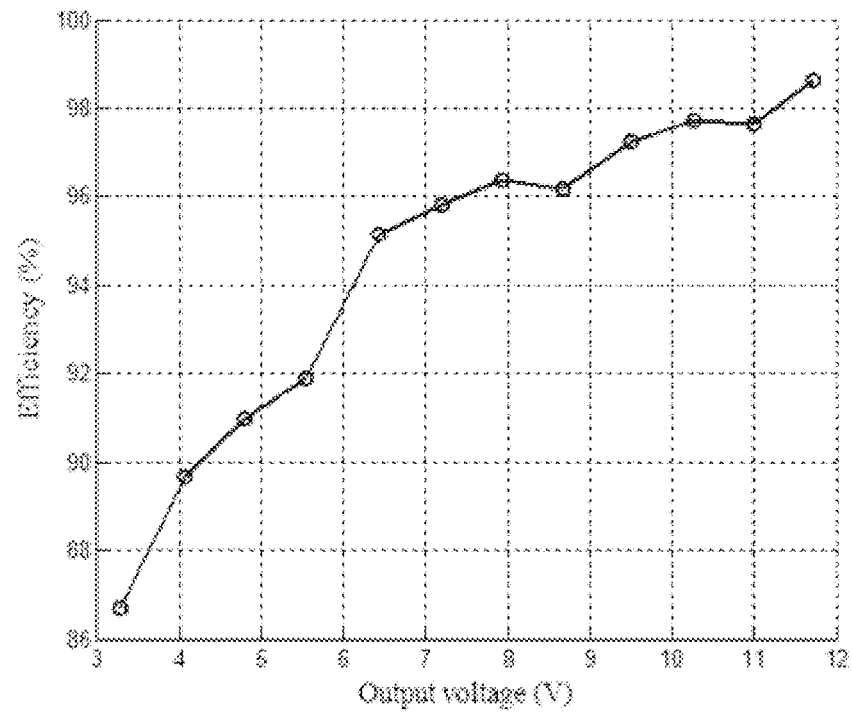
FIG. 13A shows a plot of efficiency versus output voltage for a step-down SC converter according to an embodiment of the subject invention, where the output power is 20 W, the input voltage is 12 V, and the switching frequency is 200 kHz.
Figure 13B:
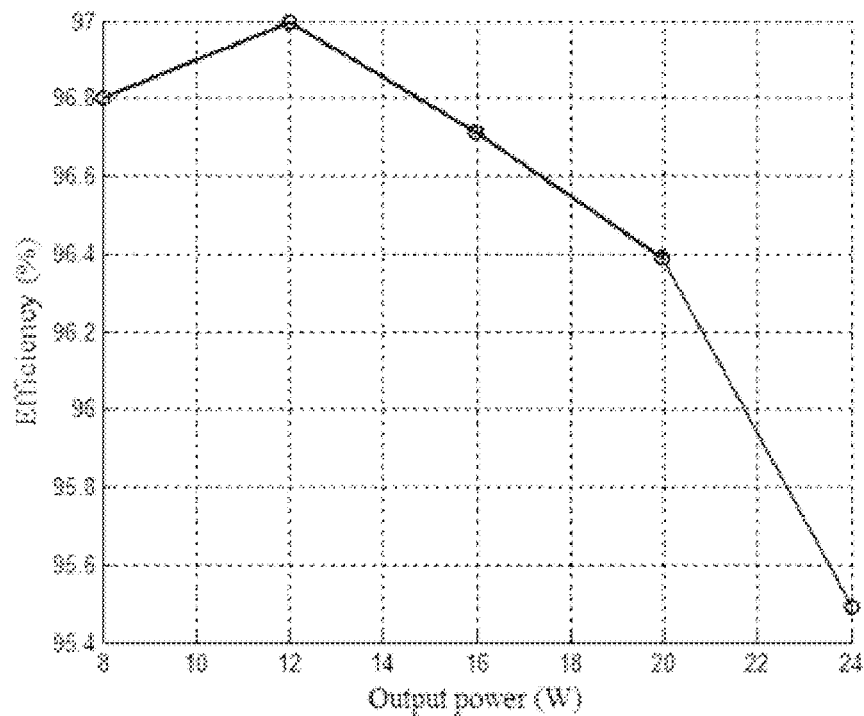
FIG. 13B shows a plot of efficiency versus output power for a step-down SC converter according to an embodiment of the subject invention, where the output voltage is 8 V regulated, the input voltage is 12 V, and the switching frequency is 200 kHz.

A step-down SC converter comprising one first module (FIG. 8A) and one last module (FIG. 8C) was simulated. The input voltage was 12 V, and the switching frequency was 200 kHz. FIG. 13A shows a plot of the efficiency of this converter versus output voltage, with an output power of 20 W. FIG. 13B shows a plot of the efficiency versus output power with an output voltage of 8 V regulated. Referring to FIGS. 13A and 13B, the results show that the converter is of high efficiency. At 8 V fixed output voltage, the maximum efficiency is as high as 97%.

Example 3

Figure 14A:
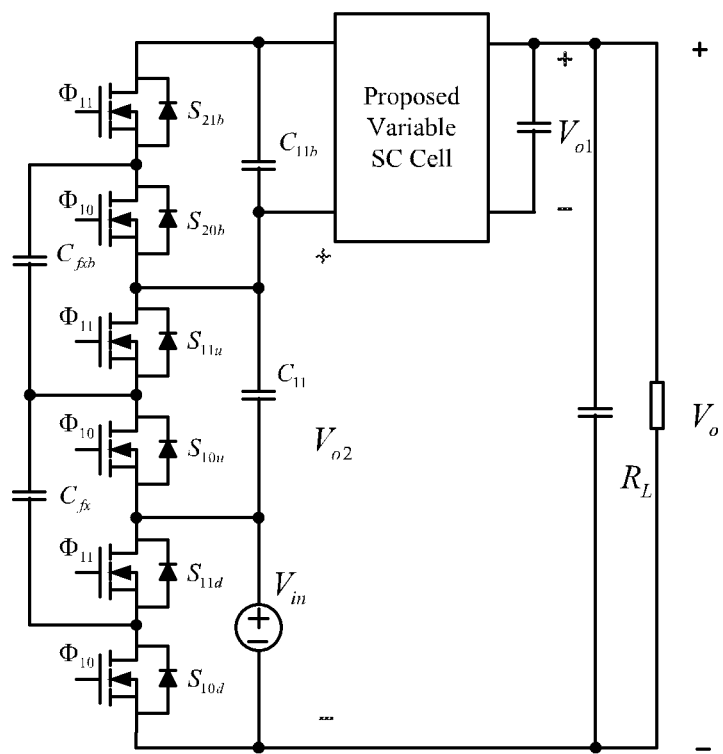
FIG. 14A shows a block diagram of the circuit topology of an SC regulator according to an embodiment of the subject invention.
Figure 14B:
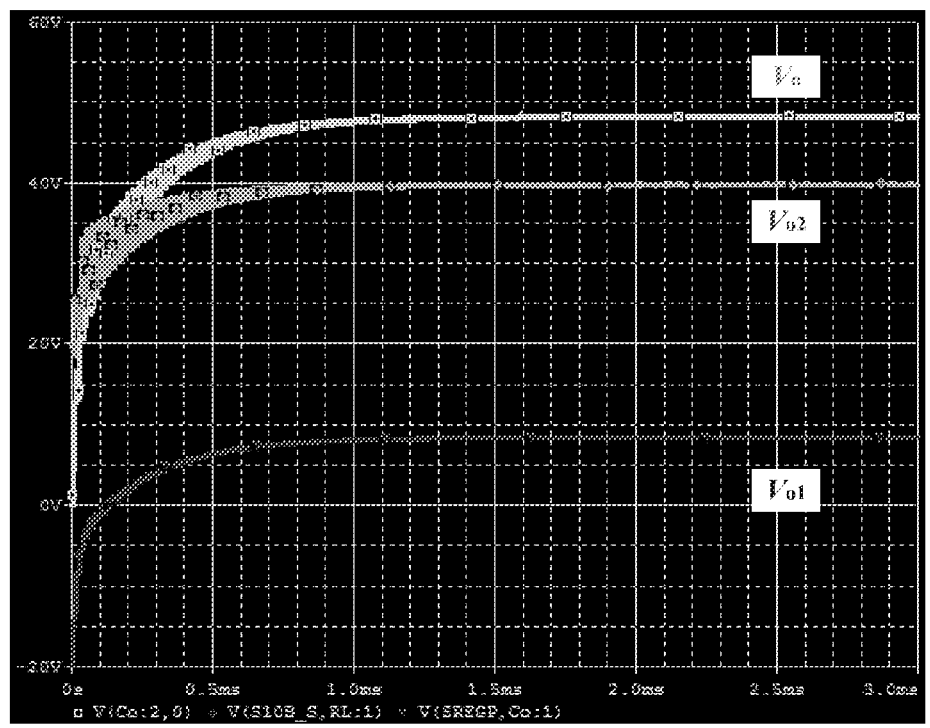
FIG. 14B shows the output voltage waveform of the SC regulator of FIG. 14A.

Two modules, one as depicted in FIG. 8B and one as depicted in FIG. 8C were cascaded and applied as variable SC cells in a ladder SC converter structure to form a Type III regulated SC converter. The structure is shown in FIG. 14A. The output voltage of this structure was simulated, and the simulated output waveforms are shown in FIG. 14B. The lowest line is $V_{o1}$, the middle line (vertically) is $V_{o2}$, and the highest line is $V_o$.

Example 4

Figure 15C:
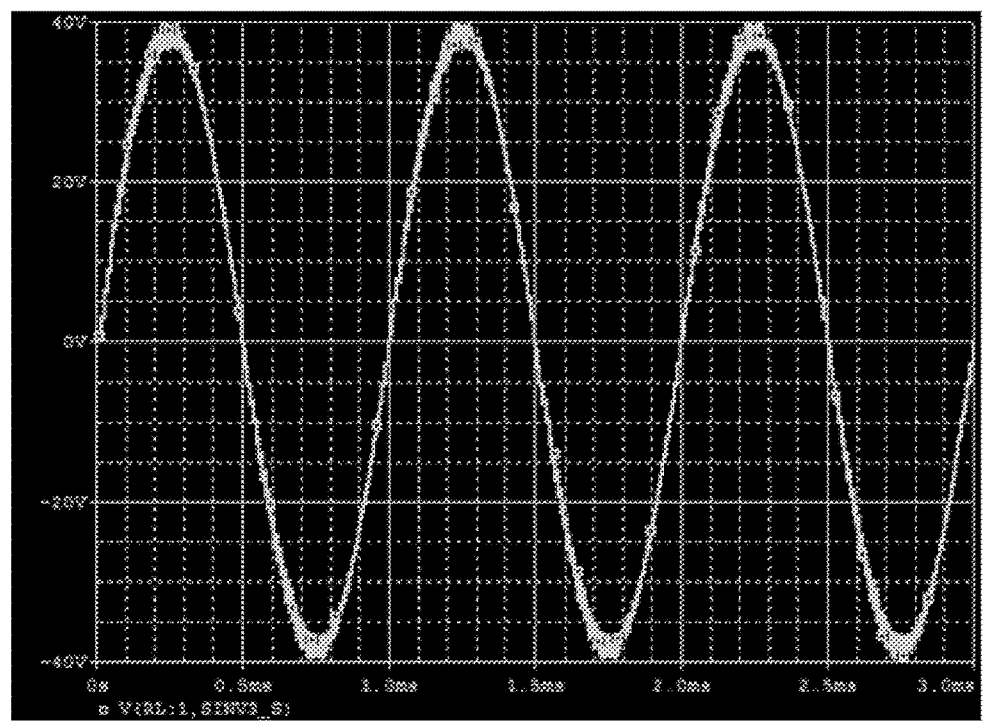
FIG. 15C shows the output voltage waveform of the DC-AC inverter of FIG. 15A.
Figure 15D:
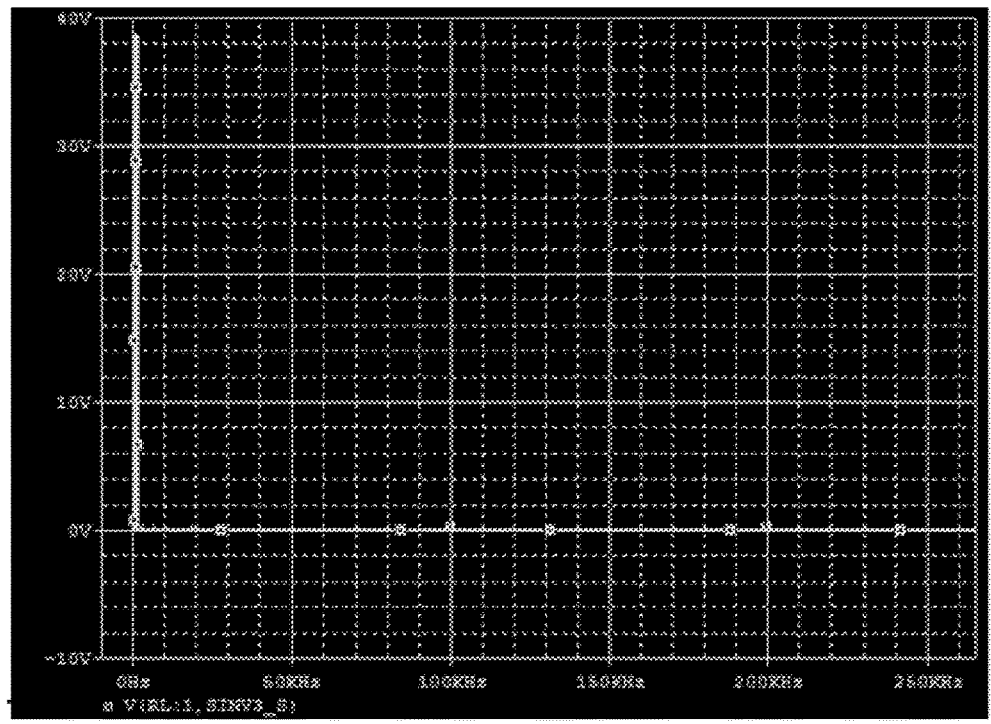
FIG. 15D shows the frequency spectrum of the DC-AC inverter of FIG. 15A.

The DC-AC inverter of FIG. 15A was simulated. FIG. 15C shows the output voltage waveform of the DC-AC inverter, and FIG. 15D shows the frequency spectrum of the DC-AC inverter. Referring to FIGS. 15C and 15D, the output voltage can track closely to the reference sine wave. The achievable power conversion efficiency was 94.7%.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] http://www.erec.org/media/publications/2040-scenario.html.

[2] Y. Tezuka, H. Kumamoto, Y. Saito, F. Ueno, and T. Inoue, "A low power DC-DC converter using a switched-capacitor transformer," in IEEE INTELEC, October 1983, pp. 261-268.

[3] R. Marusarz, "A switched-capacitor, inductorless DC-AC voltage step-up power converter," in IEEE PESC, June 1989, pp. 99-103.

[4] F. Ueno, T. Inoue, and I. Oota, "Realization of a switched-capacitor AC-DC converter using a new phase controller," in IEEE ISCAS, June 1991, pp. 1057-1060.

[5] I. 0. F. Ueno, T. Inoue and I. Harada, "Realization of a switched-capacitor AC-AC converter," in Europ. Conf. on Circ. Theor. and Desig., September 1993, pp. 1177-1180.

[6] 0. C. Mak, Y. C. Wong, and A. Ioinovici, "Step-up DC power supply based on a switched-capacitor circuit," IEEE Trans. Ind. Appl., vol. 42, no. 1, pp.90-97, February 1995.

[7] G. Zhu and A. Ioinovici, "Switched-capacitor power supplies: DC voltage ratio, efficiency, ripple, regulation," in IEEE ISCAS, vol. 1, pp. 553-556, May 1996.

[8] A. Ioinovici, "Switched-capacitor power electronics circuits," IEEE Circuits Syst. Mag., vol. 41, no. 2, pp. 37-42, September 2001.

[9] H. S. H. Chung, "Development of DCDC regulators based on switched-capacitor circuits," in IEEE Int. Symp. Circu. Syst. (ISCAS), vol. 5, pp. 210-213, May 1999.

[10] G. Zhu, H. Wei, I. Batarseh, and A. Ioinovici, "A new switched-capacitor DC-DC converter with improved line and load regulations," in IEEE ISCAS, vol. 5, pp. 234-237, May 1999.

[11] D. Maksimovic and S. Dhar, "Switched-capacitor DC-DC converters for low-power on-chip applications," in IEEE Power Electron. Special. Conf. (PESC), vol. 1, pp. 54-59, August 1999.

[12] H. Chung, S. Y. Hui, S. C. Tang, and A. Wu, "On the use of current control scheme for switched-capacitor DC/DC converters," IEEE Trans. Ind. Electron., vol. 47, no. 2, pp. 238-244, April 2000.

[13] H. Chung, S. Y. R. Hui, and S. C. Tang, "Development of low-profile DC-DC converter using switched-capacitor circuits and coreless pcb gate drive," in IEEE PESC, vol. 1, pp. 48-53, August 1999.

[14] S. Ben-Yaakov and A. Kushnerov, "Algebraic foundation of self-adjusting switched-capacitors converters," in IEEE ECCE, pp. 1582-1589, September 2009.

[15] E. Bayer and H. Schmeller, "Charge pump with active cycle regulation-closing the gap between linearand skip modes," in IEEE PESC, vol. 3, pp. 1497-1502, June 2000.

[16] C. K. Cheung, S. C. Tan, C. K. Tse, and A. Ioinovici, "On energy efficiency of switched-capacitor converters," IEEE Trans. on Power Electron., vol. 28, no. 2, pp. 862-876, February 2013.

[17] E. Bayer and H. Schmeller, "A high efficiency single-cell cascaded charge pump topology-the competitive alternative to inductive boost converters," in IEEE PESC, pp. 290-295, June 2001.

[18] B. Wu, K. Smedley, S. Sigmond, "A unified switched-capacitor converter," in IEEE ECCE, pp. 2781-2786, September 2014.

[19] Y. K. Ramadass and A. P. Chandrakasan, "Voltage scalable switched-capacitor DC-DC converter for ultra-low-power on-chip applications," in IEEE PESC, pp. 2353-2359, June 2007.

[20] B. A. Fette and S. D. DaBell, "Dynamically configurable switched-capacitor power supply and method," U.S. Pat. No. 5,414,614.

[21] B. Fotouhi and R. Gregorian, "Voltage regulated charge pump," U.S. Pat. No. b 6,300,820.

[22] W. J. McIntyre and J. P. Kotowski, "Switched-capacitor circuit having voltage management and method," U.S. Pat. No. 6,169,673.

[23] J. Kotowski and W. J. McIntyre, "Buck and boost switched-capacitor gain stage with optional shared rest state," U.S. Pat. No. 6,198,645.

[24] J. Kotowski, W. J. McIntyre, and J. P. Parry, "Capacitor DC-DC converter with PFM and gain hopping," U.S. Pat. No. 6,055,168.

[25] D. Wu and P. Dermy, "Charge pump based voltage regulator with smart power regulation," U.S. Pat. No. 6,756,838.

[26] D. D. Nebrigic, "Progressive start-up circuit for activating a charge pump," US patent no. US20010033501.

[27] W.-W. Feng and J.-H. Li, "Charge pump DC/DC converter with constant-frequency operation," US patent no. US20060006855.

[28] P. G. Villar, "Voltage Converter," Europe patent no. EP2385615.

[29] S. H. Nork, "Inductorless step-up and step-down converter with inrush current limiting," U.S. Pat. No. 5,973,944.

[30] C. E. Peschke, "Voltage regulated charge pump with regulated charge current into the flying capacitor," U.S. Pat. No. 7,276,960.

[31] K. T. P. Mok and H. Lee, "Switched-capacitor regulators," U.S. Pat. No. 7,375,992.

[32] A. Coffey and A. Somerville, "Use of charge pump active discharge," U.S. Pat. No. 7,170,271.

[33] F. Pan, J. H. Huynh, and Q. V. Nguyen, "Low voltage charge pump with regulation," U.S. Pat. No. 7,586,362.

[34] D. Nebrigic et. al, "Dynamically-controlled, intrinsically regulated charge pump power converter," U.S. Pat. No. 6,310,789.

[35] M. Seeman and R. Jain, "Single-bound hysteretic regulation of switched-capacitor converters," U.S. Pat. No. 8,368,369.

[36] B. S. Oraw and T. Kamgaing, "Series and parallel hybrid switched-capacitor networks for IC power delivery," US patent no. US20130058141.

[37] B. S. Oraw, T. Kamgaing, "Series and parallel hybrid switched-capacitor networks for is power delivery," US patent no. US20140159681.

[38] C. Kuratli, "Power supply arrangement for battery powered device," US patent no. US20060019721.

[39] C. Kuratli, "Power supply arrangement for battery powered device," U.S. Pat. No. 7,307,858.

[40] D. Ma and I. Chowdhury, "Adaptive-gain step-up/down switched-capacitor dc/dc converters," US patent no. US20110101938.

[41] F. Azrai, M. Yates, and David Nelms, "Trench capacitor power supply system and method," US patent no. US20050213280.

[42] F. Azrai, M. Yates, and D. Nelms, "Switched-capacitor power supply system and method," US patent no. US20050213267.

[43] T. Ogata and T. Suzuki, "DC-DC converter with switchable capacitors," US patent no. US20060028849.

[44] Y. Shiwaya, "Operation control method of charge pump circuit," US patent no. US20100188065.

[45] D. Pappalardo, M. Gaibotti, G. Palumbo, A. Conte, and S. L. Giudice, "Variable stage charge pump," U.S. Pat. No. 6,927,441.

[46] H. Collins, "High power switched-capacitor voltage conversion and regulation apparatus," U.S. Pat. No. 5,581,454.

[47] T. Ogata, and T. Suzuki, "DC-DC converter with switchable capacitors," U.S. Pat. No. 7,468,898.

[48] H. Fujiwara, "Booster circuit," U.S. Pat. No. 7,663,427.

[49] Y. Shiwaya, "Operation control method of charge pump circuit," U.S. Pat. No. 8,295,064.

[50] E. Bayer, "DC/DC converter," U.S. Pat. No. 6,483,282.

[51] S. Menichelli, "Multiplier improved voltage," U.S. Pat. No. 5,831,469.

[52] J. S. Zeng, L. Burgyan, and R. A. Holloway, "Charge pumping system and method," U.S. Pat. No. 6,920,055.

[53] R. Jain, "Switched-capacitor voltage regulator having multiple conversion ratios," U.S. Pat. No. 8,089,788.

[54] W. L. Walter, "High-efficiency, low noise, inductorless step-down DC/DC converter," U.S. Pat. No. 6,438,005.

What is claimed is:

1. A switched-capacitor (SC) converter system, comprising at least two SC sub-circuits with their output voltages connected in series, wherein the at least two SC sub-circuits comprise:
   a first SC sub-circuit that has a variable voltage conversion gain such that an output voltage of the first SC sub-circuit can be dynamically varied with tight voltage control; and
   a second SC sub-circuit,
   wherein the SC sub-circuits are configured to be controlled to provide a controllable output voltage of constant direct current (DC) nature or of a variable stepped nature, and
   wherein the SC sub-circuits are configured to be controlled to provide the controllable output voltage of the variable stepped nature, and the controllable output voltage of the variable stepped nature closely follows an analog waveform.

2. The SC converter system according to claim 1, wherein the second SC sub-circuit is configured to convert an input voltage of the SC converter system to an output voltage based on a predetermined desired output voltage value of the SC converter.

3. The SC converter system according to claim 1, wherein each SC sub-circuit comprises an input port connected in series with the input port of all other SC sub-circuit, wherein the input port of each SC sub-circuit is connected to a voltage source.

4. The SC converter system according to claim 3, wherein the voltage source is an active voltage source.

5. The SC converter system according to claim 3, wherein the voltage source is an output voltage of a separate power conversion circuit.

6. The SC converter system according to claim 1, wherein each SC sub-circuit comprises at least one capacitor, and wherein the SC converter system is configured such that each capacitor of each SC sub-circuit operates in a fully-charged state.

7. The SC converter system according to claim 1, wherein the analog waveform is a rectified sinusoidal wave in a time domain.

8. The SC converter system according to claim 1, wherein each SC sub-circuit comprises at least one capacitor and at least one active switch, and wherein the SC converter system does not include any inductors.

9. The SC converter system according to claim 1, wherein the SC converter system does not include any magnets.

10. The SC converter system according to claim 1, wherein each SC sub-circuit comprises at least one SC core cell comprising an input port, a ground node, and two identical units connected in cascade,
   wherein each identical unit of the at least one SC core cell comprises:
      a capacitor;
      two fully-controllable unidirectional switches respectively connected to two ends of the capacitor to a positive node of the input port of the SC core cell unit; and
   a fully-controlled bidirectional switch connecting one end of the capacitor to the ground node of the SC core cell.

11. The SC converter system according to claim 1, wherein the at least two SC sub-circuits comprises an SC sub-circuit configured to perform voltage-step-down and an SC sub-circuit configured to perform voltage-step-up.

12. The SC converter system according to claim 11, wherein the SC converter system is configured such that the SC sub-circuit configured to perform voltage-step-up and the SC sub-circuit configured to perform voltage-step-down can operate individually or in combination to provide a dynamically controlled variable output voltage of the SC converter system.

13. An AC-DC power converter system, comprising:
a rectifier; and
the SC converter system according to claim 1 connected to the rectifier on an input side of the SC converter system.

14. The AC-DC power converter system according to claim 13, wherein, when an AC voltage input is provided to an input side of the rectifier, the AC-DC power converter system produces a tightly-regulated DC output voltage.

15. A control method for the AC-DC power converter system according to claim 13, the control method comprising varying the voltage conversion gain of the first SC sub-circuit of the SC converter system to dynamically vary the output voltage of the first SC sub-circuit.

16. A control method for the SC converter system according to claim 1, the control method comprising varying the voltage conversion gain of the first SC sub-circuit to dynamically vary the output voltage of the first SC sub-circuit.

17. A method of providing power conversion, the method comprising:
providing an input power to the switched-capacitor (SC) converter system according to claim 1; and
using the system to convert the input power to an output power with at least one characteristic different from that of the input power.

18. The method according to claim 17, wherein the at least one characteristic different from that of the input power is a magnitude of the output voltage.

19. A direct current-to-alternating current (DC-AC) power inverter system, comprising:
a full-bridge power inverter; and
a switched-capacitor (SC) converter system connected to the full-bridge power inverter on an output side of the SC converter system,
wherein the SC converter system comprises at least two SC sub-circuits with their output voltages connected in series, and
wherein the at least two SC sub-circuits comprise:
a first SC sub-circuit that has a variable voltage conversion gain such that an output voltage of the first SC sub-circuit can be dynamically varied with tight voltage control: and
a second SC sub-circuit.

20. The DC-AC power inverter system according to claim 19, wherein, when a DC voltage input is provided to an input side of the SC converter system, the DC-AC power inverter system produces a stepped sinusoidal output voltage.

21. The DC-AC power inverter system according to claim 19, wherein, when a DC voltage input is provided to an input side of the SC converter system, an output voltage of the SC converter system is a stepped voltage waveform of a rectified sinusoidal nature.

22. The DC-AC power inverter system according to claim 19, wherein the DC-AC power inverter system is configured such that polarities of successive rectified half-cycle voltage waveforms within the DC-AC power inverter system alternate positive and negative in order to form a full stepped sinusoidal voltage waveform.

23. A control method for the DC-AC power inverter system according to claim 19, the control method comprising varying the voltage conversion gain of the first SC sub-circuit of the SC converter system to dynamically vary the output voltage of the first SC sub-circuit.

24. An AC-AC power converter system, comprising:
a rectifier;
a switched-capacitor (SC) converter system connected to the rectifier on an input side of the SC converter system; and
a full-bridge power inverter connected to an output side of the SC converter system,
wherein the SC converter system comprises at least two SC sub-circuits with their output voltages connected in series, and
wherein the at least two SC sub-circuits comprise:
a first SC sub-circuit that has a variable voltage conversion gain such that an output voltage of the first SC sub-circuit can be dynamically varied with tight voltage control; and
a second SC sub-circuit.

25. The AC-AC power converter system according to claim 24, wherein, when a first AC voltage input is provided at a first frequency and a first magnitude to an input side of the rectifier, the AC-DC power converter system outputs a second AC voltage at a second frequency and a second magnitude, wherein the first frequency is different from the second frequency.

26. The AC-AC power converter system according to claim 25, wherein the first magnitude is different from the second magnitude.

27. A control method for the AC-AC power converter system according to claim 24, the control method comprising varying the voltage conversion gain of the first SC sub-circuit of the SC converter system to dynamically vary the output voltage of the first SC sub-circuit.

\* \* \* \* \*